(12) United States Patent
Heubel et al.

(10) Patent No.: US 8,345,013 B2
(45) Date of Patent: Jan. 1, 2013

(54) METHOD AND APPARATUS FOR GENERATING HAPTIC FEEDBACK FROM PLASMA ACTUATION

(75) Inventors: Robert W. Heubel, San Leandro, CA (US); Muge Bakircioglu, San Jose, CA (US); Douglas King Swalen, Los Gatos, CA (US)

(73) Assignee: Immersion Corporation, San Jose, CA (US)

( * ) Notice: Subject to any disclaimer, the term of this patent is extended or adjusted under 35 U.S.C. 154(b) by 968 days.

(21) Appl. No.: 12/353,516

(22) Filed: Jan. 14, 2009

(65) Prior Publication Data

US 2010/0177050 A1 Jul. 15, 2010

(51) Int. Cl.
*G06F 3/041* (2006.01)
(52) U.S. Cl. ................ 345/173; 434/112; 340/407.1
(58) Field of Classification Search .................. None
See application file for complete search history.

(56) References Cited

U.S. PATENT DOCUMENTS

| 5,541,372 | A | 7/1996 | Baller et al. |
| 5,543,588 | A | 8/1996 | Bisset et al. |
| 7,205,981 | B2 | 4/2007 | Cunningham |
| 2004/0246736 | A1* | 12/2004 | Desmond et al. ............ 362/496 |
| 2005/0030292 | A1* | 2/2005 | Diederiks ..................... 345/173 |
| 2005/0057528 | A1* | 3/2005 | Kleen ........................... 345/173 |
| 2005/0285846 | A1* | 12/2005 | Funaki ......................... 345/173 |
| 2007/0229233 | A1* | 10/2007 | Dort ........................... 340/407.1 |
| 2008/0068334 | A1 | 3/2008 | Olien et al. |
| 2008/0303796 | A1* | 12/2008 | Fyke ............................ 345/173 |

* cited by examiner

*Primary Examiner* — Lixi C Simpson
(74) *Attorney, Agent, or Firm* — Pillsbury Winthrop Shaw Pittman LLP

(57) ABSTRACT

A method and device for generating haptic feedback over a touch surface using plasma actuation are disclosed. A haptic device includes a touch surface, plasma, and a substrate. In one embodiment, the touch surface, which can be made of flexible and/or deformable materials, is capable of sensing one or more events. The substrate is situated adjacent to the touch surface with a separation gap, which physically separates the substrate from the touch surface. The substrate provides haptic feedback in response to the event(s). The plasma is capable of accumulating at one or more pockets located in the separation gap, and configured to facilitate the haptic feedback via energy transfer.

27 Claims, 16 Drawing Sheets

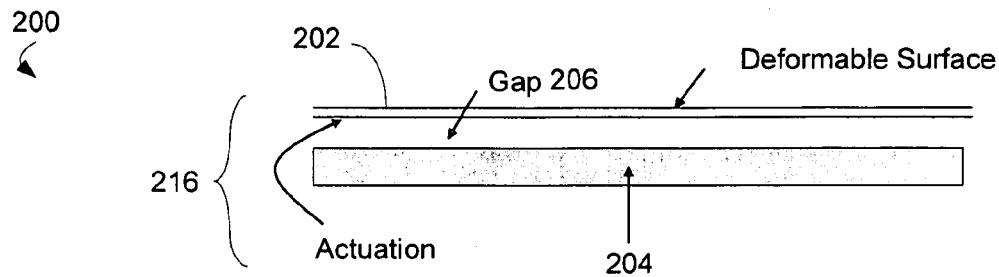
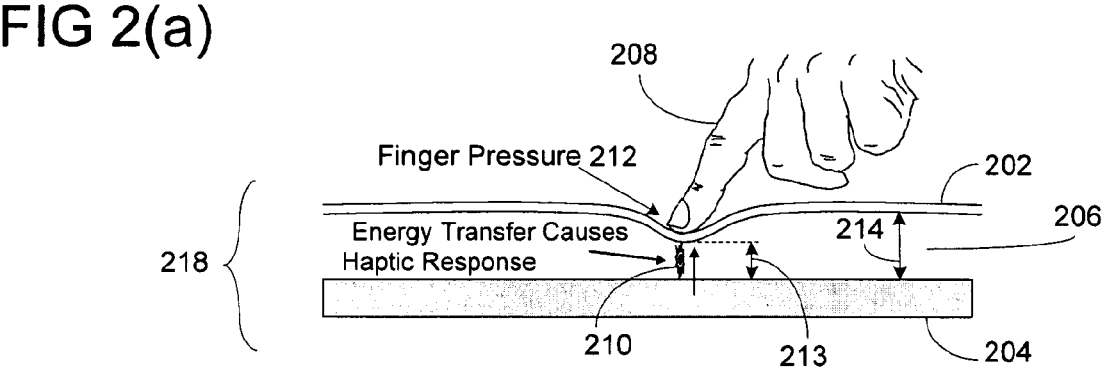
FIG 2(a)
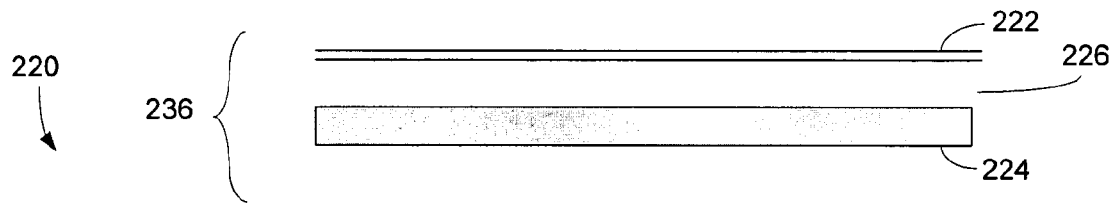
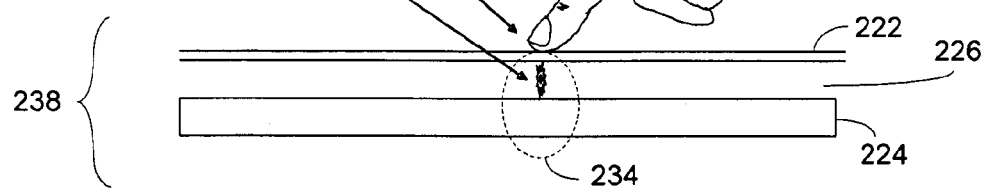
FIG 2(b)

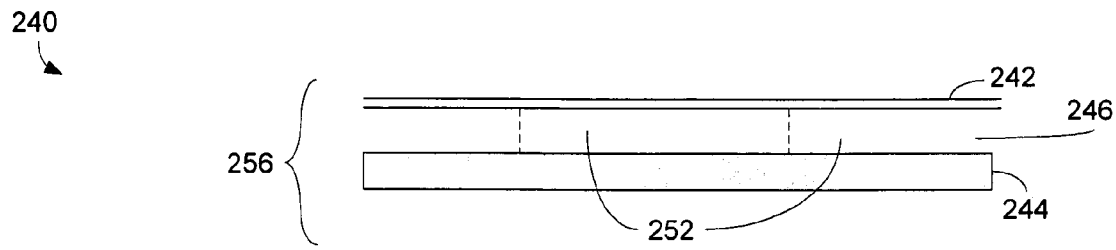
FIG 2(c)
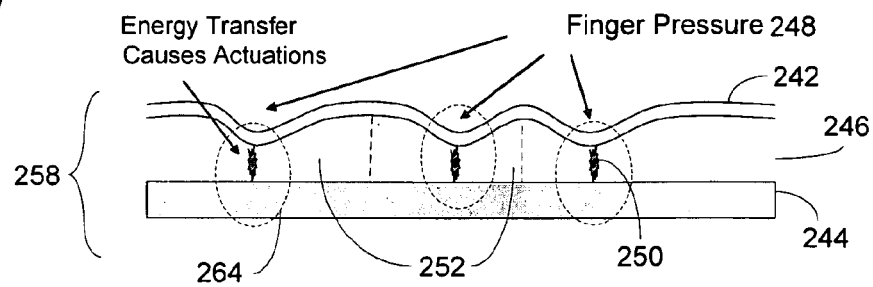
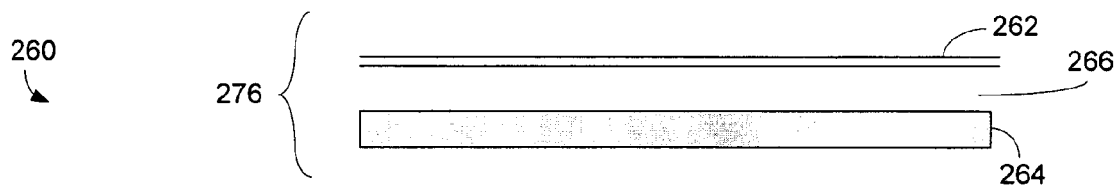
FIG 2(d)
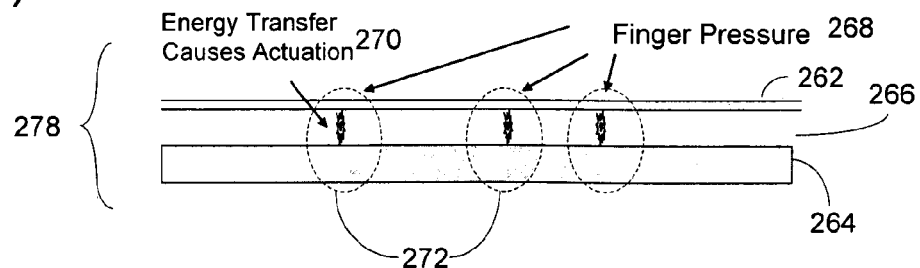

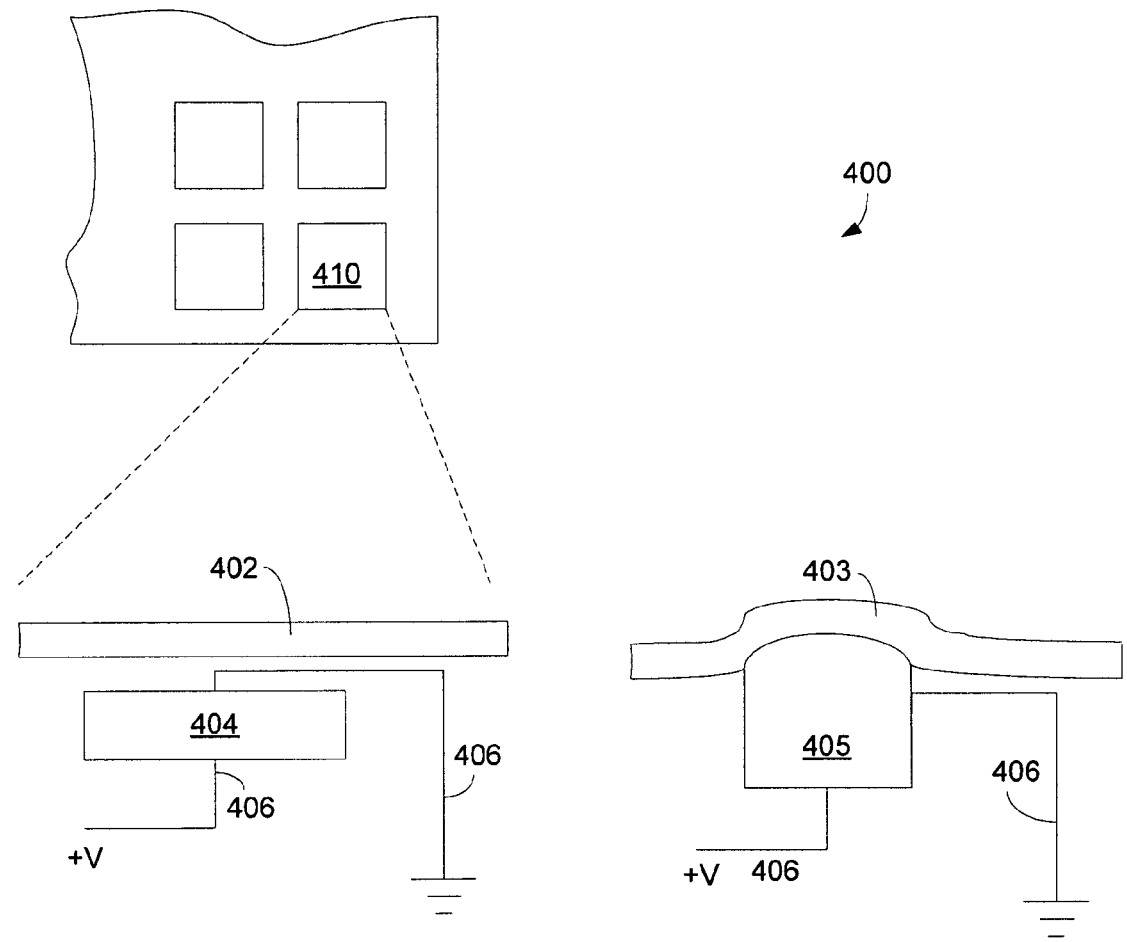
FIG 4(a)  FIG 4(b)

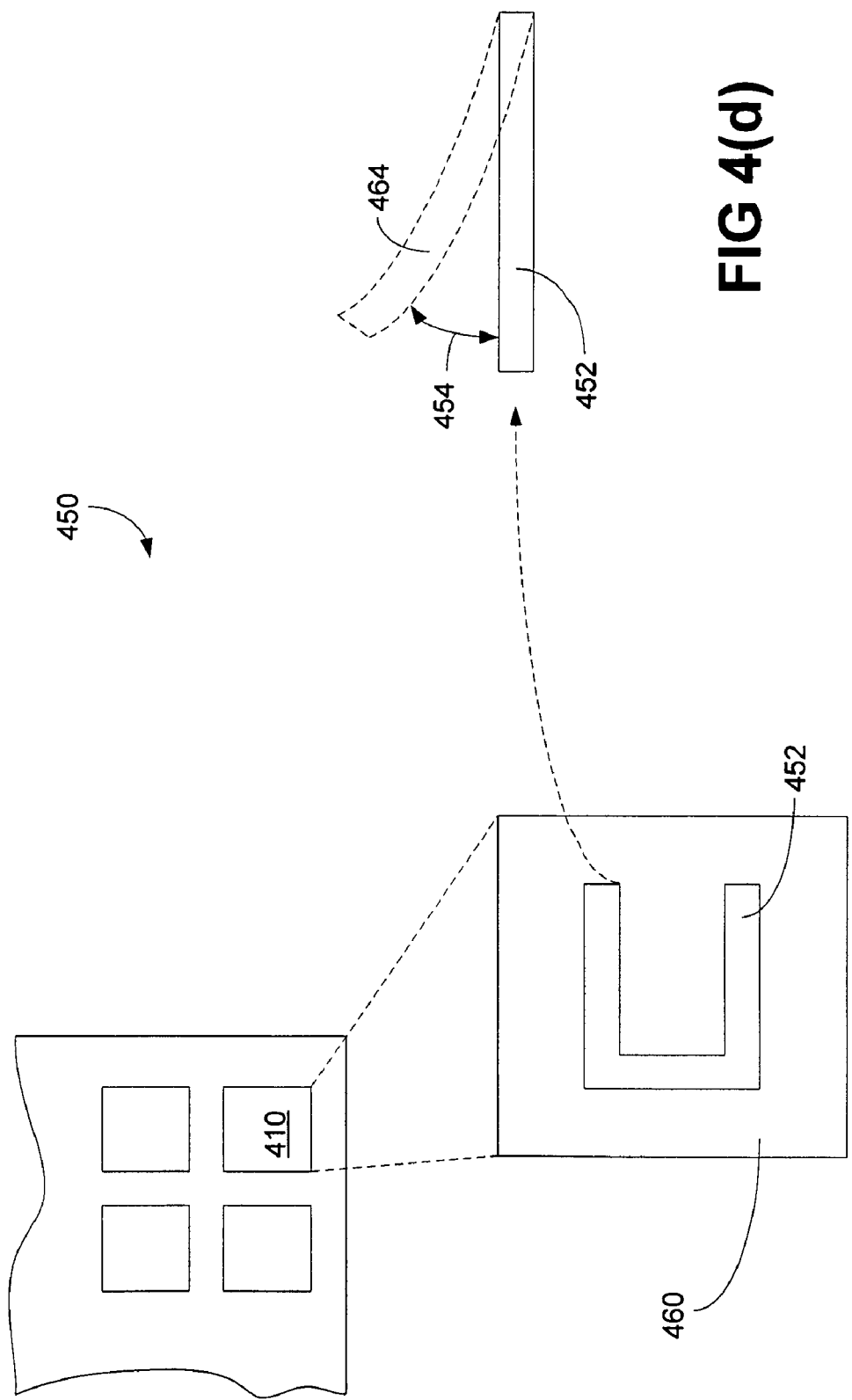

METHOD AND APPARATUS FOR GENERATING HAPTIC FEEDBACK FROM PLASMA ACTUATION

RELATED APPLICATIONS

This application is related to the following co-pending applications, each assigned to the Assignee of the present invention.

a. Application Ser. No. 11/823,192, filed Jun. 26, 2007, entitled "Method and Apparatus for Multi-touch Tactile Touch Panel Actuator Mechanisms";

b. Application Ser. No. 11/823,258, filed Jun. 26, 2007, entitled "Method and Apparatus for Multi-touch Haptic Touch Panel Actuator Mechanisms"; and c. Application Ser. No. 11/943,862, filed Nov. 21, 2007, entitled "Method and Apparatus for Providing a Fixed Relief Touch Screen with Locating Features Using Deformable Haptic Surfaces."

d. Application Ser. No. 12/061,463, filed Apr. 2, 2008, entitled "Method and Apparatus for Providing Multi-Point Feedback Texture Systems."

FIELD

The exemplary embodiment(s) of the present invention relates to a field of electronic interface devices. More specifically, the exemplary embodiment(s) of the present invention relates to actuator materials for generating haptic feedback.

BACKGROUND

As computer-based systems, appliances, automated teller machines, point of sale terminals and the like have become more prevalent in recent years, the ease of use of the human-machine interface has become increasingly important. A conventional touch-sensitive panel usually has a smooth flat surface and uses sensors such as capacitive sensors and/or pressure sensors to sense locations being touched by a finger(s) and/or an object(s). For example, a user presses a region of a touch screen commonly with a fingertip to emulate a button press and/or moves his or her finger on the panel according to the graphics displayed behind the panel on the display device. To generate haptic sensation in response to a touch on a touch screen, typical mechanical actuators or carries, for instance, may be used to emulate a button.

A problem associated with the conventional approach for generating a haptic feedback is relying on global motion of a mechanical carrier attached to the touch screen to produce haptic or tactile feedback. The conventional mechanical actuator or carrier, which is capable of generating global motion, is usually bulky, heavy, and difficult to assemble due to many mechanical parts.

SUMMARY

A method and device for generating haptic feedback over a touch surface using plasma actuation are disclosed. A haptic device includes a touch surface, plasma, and a substrate. In one embodiment, the touch surface, which can be made of flexible and/or deformable materials, is capable of sensing one or more events. The substrate is situated adjacent to the touch surface with a separation gap, which physically separates the substrate from the touch surface. The substrate provides haptic feedback in response to the event(s). The plasma is capable of accumulating at one or more pockets located in the separation gap, and configured to facilitate the haptic feedback via energy transfer.

Additional features and benefits of the exemplary embodiment(s) of the present invention will become apparent from the detailed description, figures and claims set forth below.

BRIEF DESCRIPTION OF THE DRAWINGS

The exemplary embodiment(s) of the present invention will be understood more fully from the detailed description given below and from the accompanying drawings of various embodiments of the invention, which, however, should not be taken to limit the invention to the specific embodiments, but are for explanation and understanding only.

FIGS. 2(a-d) illustrate cross section views of haptic devices capable of generating haptic feedback using plasma actuator in accordance with one embodiment of the present invention;

FIGS. 4(a-d) illustrate examples of haptic cells in a haptic device employing piezoelectric materials and Micro-Electro-Mechanical Systems ("MEMS") elements in accordance with one embodiment of the present invention;

DETAILED DESCRIPTION

Exemplary embodiments of the present invention are described herein in the context of a method, system and apparatus for providing haptic feedback on a touch surface using plasma actuator.

Those of ordinary skilled in the art will realize that the following detailed description of the exemplary embodiment(s) is illustrative only and is not intended to be in any way limiting. Other embodiments will readily suggest themselves to such skilled persons having the benefit of this disclosure. Reference will now be made in detail to implementations of the exemplary embodiment(s) as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

A plasma haptic device, in one embodiment, generates haptic feedback over a touch surface using plasma actuation. A device includes a touch surface, plasma, and a substrate. In one embodiment, the touch surface, which can be made of flexible and/or deformable materials, is capable of sensing one or more events. The substrate is situated adjacent to the touch surface with a separation gap, which physically separates the substrate from the touch surface. The substrate provides haptic feedback in response to the event(s). The plasma is capable of accumulating at one or more pockets located in the separation gap, and configured to facilitate the haptic feedback via energy transfer.

Figure 1A:
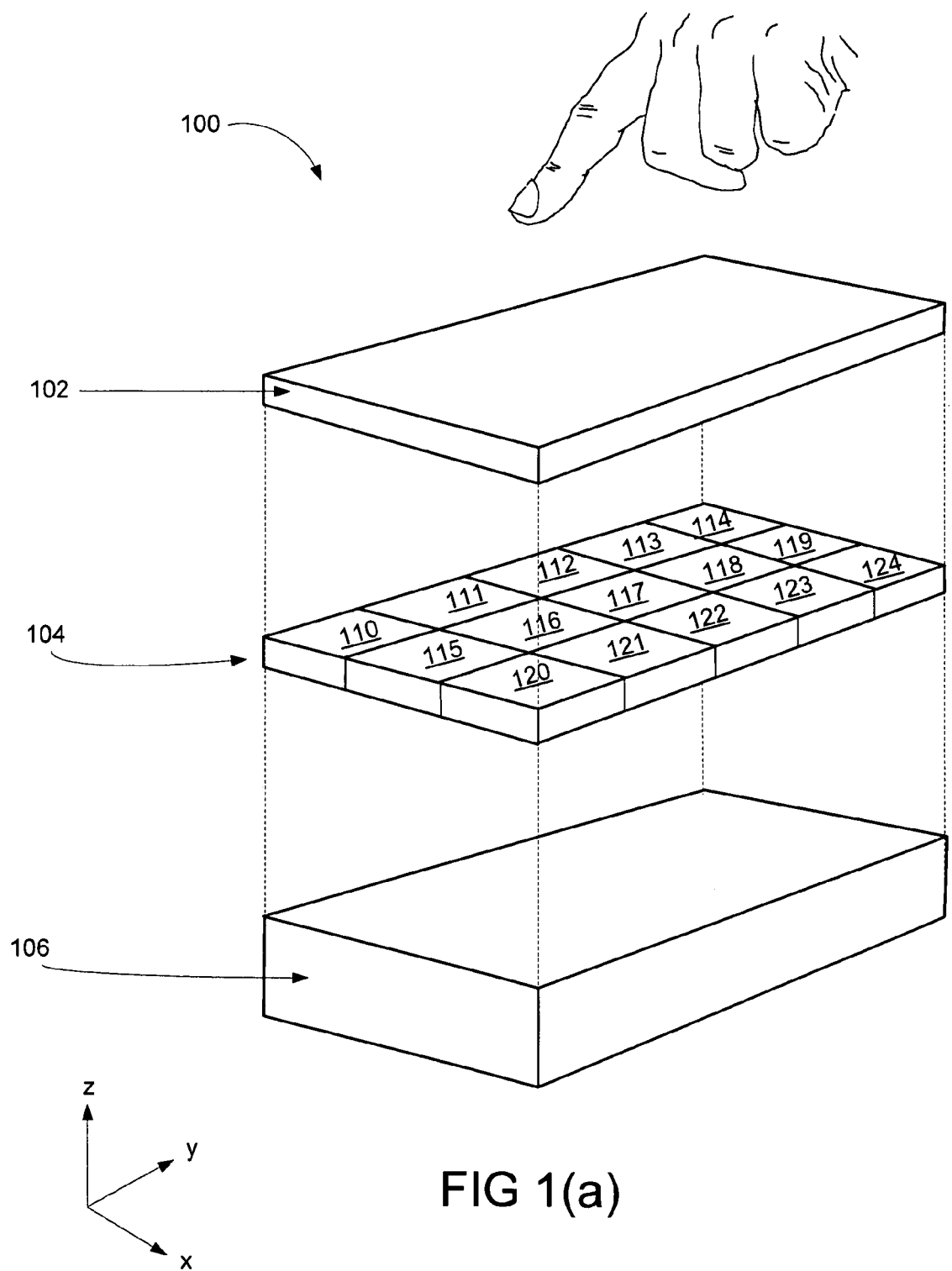
FIGS. 1(a-e) illustrate haptic devices using haptic substrates and flexible surfaces in accordance with one embodiment of the present invention.

FIG. 1(a) shows a three-dimensional (3D) diagram illustrating a haptic flexible structure 100 using a haptic substrate and a flexible surface in accordance with one embodiment of the present invention. Flexible structure 100 includes a flexible surface layer 102, a haptic substrate 104, and a deforming mechanism 106. In one embodiment, flexible structure 100 is an article of haptic fabric or cloth capable of changing patterns in response to the haptic feedback. It should be noted that the underlying concept of the exemplary embodiment of the present invention would not change if one or more blocks (circuits or layers) were added to or removed from structure 100.

Flexible surface layer 102, in one instance, is made of soft and/or elastic materials such as silicone rubber, which is also known as polysiloxane. A function of the flexible surface layer 102 is to change its surface shape or texture upon contact with the physical pattern of haptic substrate 104. The physical pattern of haptic substrate 104 is variable as one or more of the local features 110-124 can be raised or lowered to present features to affect the surface of the flexible surface layer 102 upon contact. Once the physical pattern of haptic substrate 104 is determined, the texture of flexible surface layer 102 can change to confirm its surface texture to the physical pattern of haptic substrate 104. It should be noted that the deformation of flexible surface layer 102 from one texture to another can be controlled by deforming mechanism 106. For example, when deforming mechanism 106 is not activated, flexible surface layer 102 maintains its smooth configuration floating or sitting over haptic substrate 104. The surface configuration of flexible surface layer 102, however, deforms or changes from a smooth configuration to a coarse configuration when deforming mechanism 106 is activated. Haptic substrate 104 is subsequently in contact with flexible surface layer 102 so as to generate a similar pattern on the top surface of flexible surface layer 102.

Alternatively, flexible surface layer 102 is a flexible touch sensitive surface, which is capable of accepting user inputs. The flexible touch sensitive surface can be divided into multiple regions wherein each region of the flexible touch sensitive surface can accept an input when the region is being touched or depressed by a finger. In one embodiment, the flexible touch sensitive surface includes a sensor, which is capable of detecting a nearby finger and waking up or turning on the device. Flexible surface layer 102 may also include a flexible display, which is capable of deforming together with flexible surface layer 102. It should be noted that various flexible display technologies can be used to manufacture flexible displays, such as organic light-emitting diode (OLED), organic, or polymer TFT (Thin Film Transistor).

Haptic substrate 104 is a surface reconfigurable haptic device capable of changing its surface pattern in response to one or more pattern activating signals. Haptic substrate 104 can also be referred to as a haptic mechanism, a haptic layer, a tactile element, and the like. Haptic substrate 104, in one embodiment, includes multiple tactile or haptic regions 110-124, wherein each region can be independently controlled and activated. Since each tactile region can be independently activated, a unique surface pattern of haptic substrate 104 can be composed in response to the pattern activating signals. In another embodiment, every tactile region is further divided into multiple haptic bits wherein each bit can be independently excited or activated or deactivated.

Haptic substrate 104, or a haptic mechanism, in one embodiment, is operable to provide haptic feedback in response to an activating command or signal. Haptic substrate 104 provides multiple tactile or haptic feedbacks wherein one tactile feedback is used for surface deformation, while another tactile feedback is used for input confirmation. Input confirmation is a haptic feedback informing a user about a selected input. In one embodiment, haptic substrate 104 is flexible and soft. For example, haptic mechanism 104 can be implemented by various techniques including vibration, vertical displacement, lateral displacement, push/pull technique, air/fluid pockets, local deformation of materials, resonant mechanical elements, piezoelectric materials, micro-electromechanical systems ("MEMS") elements, thermal fluid pockets, MEMS pumps, variable porosity membranes, laminar flow modulation, or the like.

Haptic substrate 104, in one embodiment, is constructed by flexible, semi-flexible, semi-rigid, or rigid materials. In one embodiment, haptic substrate should be more rigid than flexible surface 102 thereby the surface texture of flexible surface 102 can confirm to the surface pattern of haptic substrate 104. Haptic substrate 104, for example, includes one or more actuators, which can be constructed from fibers (or nanotubes) of electroactive polymers ("EAP"), piezoelectric elements, fiber of shape memory alloys ("SMAs") or the like. EAP, also known as biological muscles or artificial muscles, is capable of changing its shape in response to an application of voltage. The physical shape of an EAP may be deformed when it sustains large force. EAP may be constructed from electrostrictive polymers, dielectric elastomers, conducting polymers, ionic polymer metal composites, responsive gels, bucky gel actuators, or a combination of the above-mentioned EAP materials.

SMA, also known as memory metal, is another type of material which can be used to construct haptic substrate 104. SMA may be made of copper-zinc-aluminum, copper-aluminum-nickel, nickel-titanium alloys, or a combination of copper-zinc-aluminum, copper-aluminum-nickel, and/or nickel-titanium alloys. A characteristic of SMA is that when its original shape is deformed, it regains its original shape in accordance with the ambient temperature and/or surrounding environment. It should be noted that the present embodiment may combine the EAP, piezoelectric elements, and/or SMA to achieve a specific haptic sensation.

Deforming mechanism 106 provides a pulling and/or pushing force to translate elements in the haptic substrate 104 causing flexible surface 102 to deform. For example, when deforming mechanism 106 creates a vacuum between flexible surface 102 and haptic substrate 104, flexible surface 102 is pushed against haptic substrate 104 causing flexible surface 102 to show the texture of flexible surface 102 in accordance with the surface pattern of haptic substrate 104. In other words, once a surface pattern of haptic substrate 104 is generated, flexible surface is pulled or pushed against haptic substrate 104 to reveal the pattern of haptic substrate 104 through the deformed surface of flexible surface 102. In one embodiment, haptic substrate 104 and deforming mechanism 106 are constructed in the same or substantially the same layer.

Upon receipt of a first activating signal, haptic substrate 104 generates a first surface pattern. After formation of the surface pattern of haptic substrate 104, deforming mechanism 106 is subsequently activated to change surface texture of flexible surface 102 in response to the surface pattern of haptic substrate 104. Alternatively, if haptic substrate 104 receives a second activating signal, it generates a second pattern.

Haptic substrate 104 further includes multiple tactile regions wherein each region can be independently activated to form a surface pattern of the substrate. Haptic substrate 104 is also capable of generating a confirmation feedback to confirm an input selection entered by a user. Deforming mechanism 106 is configured to deform the surface texture of flexible surface 102 from a first surface characteristic to a second surface characteristic. It should be noted that haptic device further includes a sensor, which is capable of activating the device when the sensor detects a touch on flexible surface 102. Deforming mechanism 106 may be a vacuum generator, which is capable of causing flexible surface 102 to collapse against the first surface pattern to transform its surface configuration in accordance with the configuration of first pattern of haptic substrate 104.

Figure 1B:
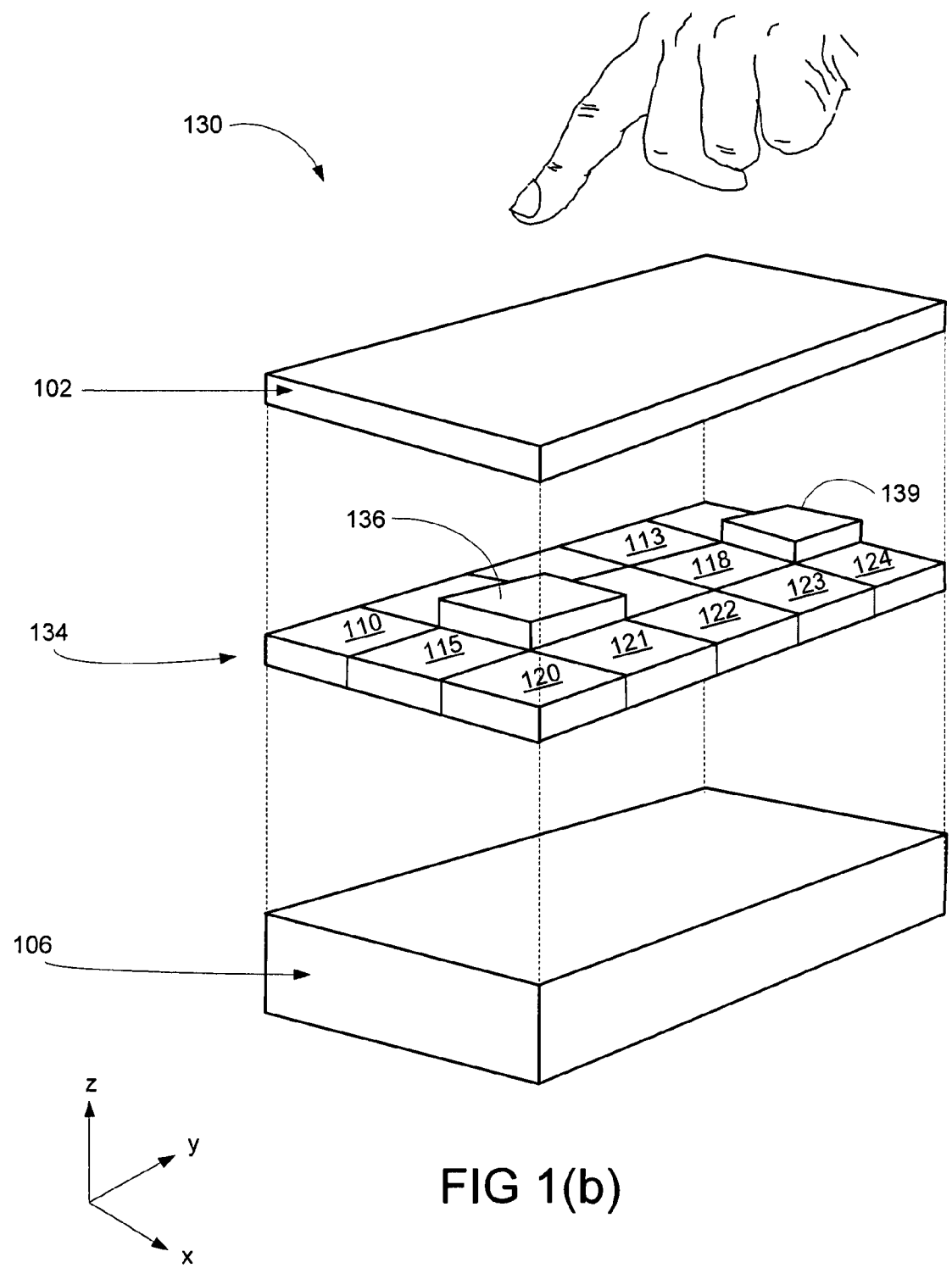

FIG. 1(b) shows a 3D diagram illustrating a haptic structure 130 using a haptic substrate and a flexible surface in accordance with one embodiment of the present invention. Structure 130 includes a flexible surface 102, a haptic substrate 134, and a deforming mechanism 106. In one embodiment, haptic structure 130 is an article of haptic fabric or cloth capable of communicating with the user via haptic feedback. It should be noted that the underlying concept of the exemplary embodiment of the present invention would not change if additional blocks (circuits or layers) were added to or removed from structure 130.

Haptic substrate 134 is similar or substantially similar to haptic substrate 104 illustrated in FIG. 1(a) except that tactile regions 136 and 139 are activated. Tactile regions 136 and 139 are raised in a z-axis direction. Upon receipt of one or more activating signals, haptic substrate 134 identifies a surface pattern in accordance with the activating signals. Haptic substrate 134 provides identified pattern by activating various tactile regions such as regions 136 and 139 to generate the pattern. It should be noted that tactile regions 136 and 139 imitate two buttons or keys. In another embodiment, tactile region 136 or 139 includes multiple haptic bits wherein each bit can be controlled for activating or deactivating.

Figure 1C:
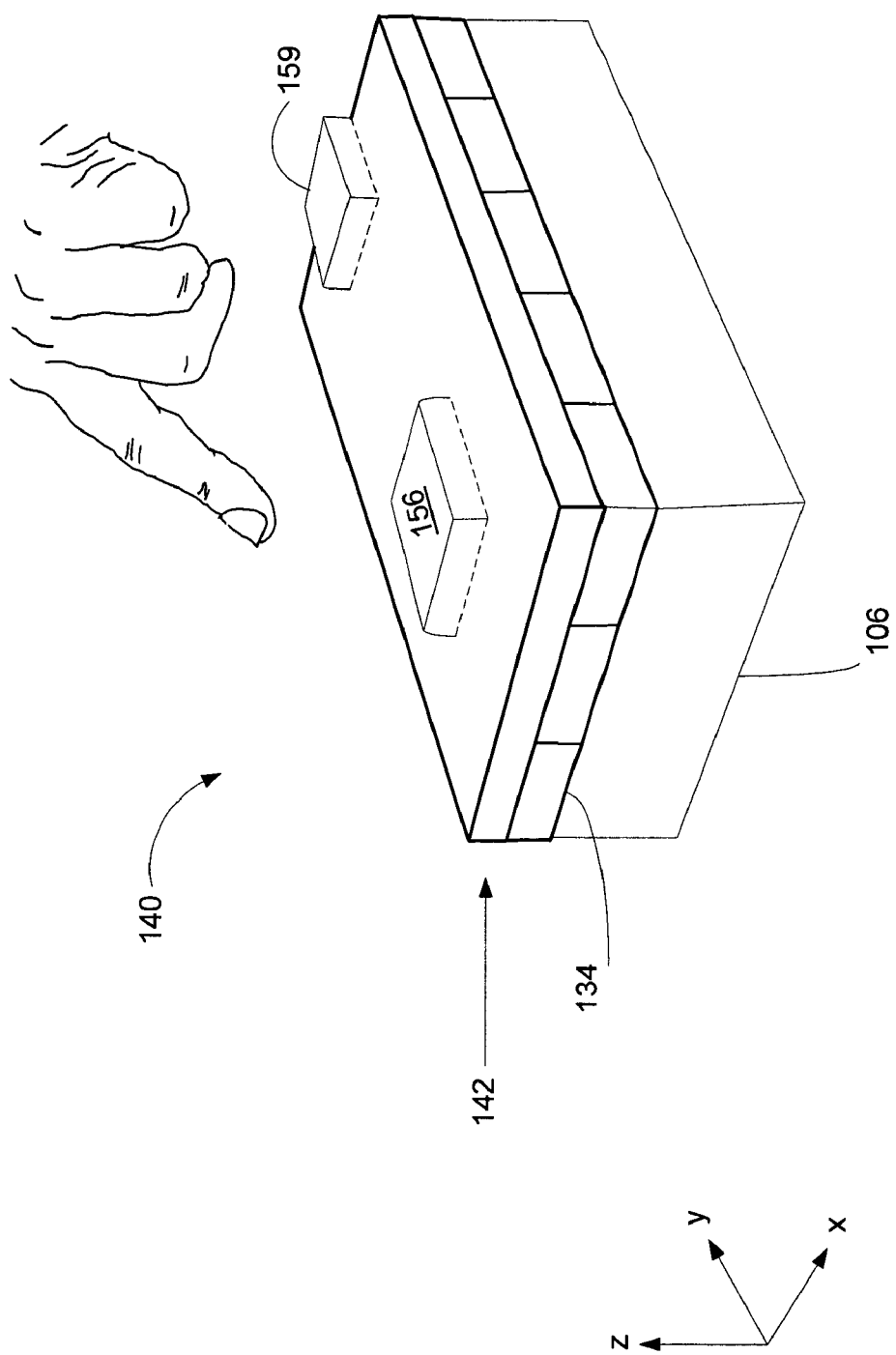

FIG. 1(c) shows a 3D diagram illustrating a haptic material or structure 140 using a haptic substrate and a flexible surface in accordance with one embodiment of the present invention. Structure 140 includes a flexible surface 142, a haptic substrate 134, and a deforming mechanism 106. It should be noted that haptic substrate 134 and deforming mechanism 106 are the same or substantially the same elements. In one embodiment, flexible structure 140 is an article of haptic fabric or cloth capable of changing patterns in response to the haptic feedback. It should be further noted that the underlying concept of the exemplary embodiment of the present invention would not change if additional blocks were added to or removed from structure 140.

When deforming mechanism 106 is activated, flexible surface 142 collapses over haptic substrate 134, which, as illustrated in FIG. 1(b), has two activated tactile regions 136 and 139, to form two bumps 156 and 159. Bumps 156 and 159, in one example, imitate two buttons. For example, haptic substrate 134 is capable of detecting a contact on button 156 or 159 and providing a haptic feedback to confirm which button had been depressed. Alternatively, haptic substrate 134 is capable of generating one of many unique physical patterns in response to one or more signals. As such, flexible surface 102 can be reconfigured to different patterns in accordance with the pattern or patterns provided by haptic substrate 134. The surface texture of flexible surface can be configured to a telephone key pad, a calculator buttons, computer key pad, radio panel, PDA interfaces, or the like.

Figure 1D:
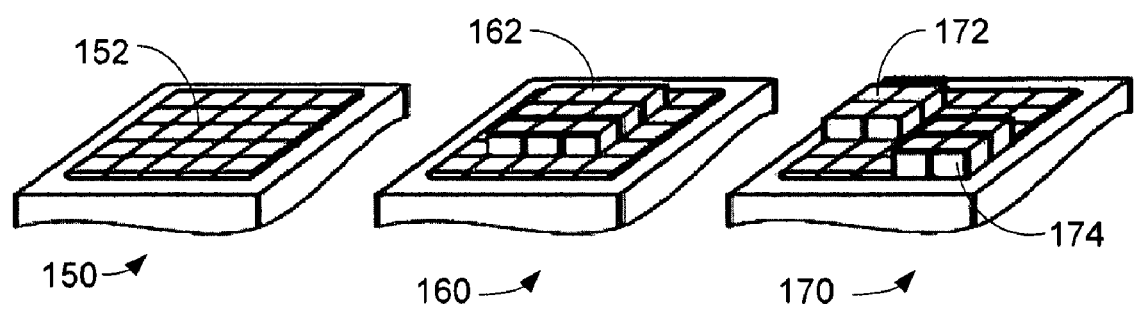

FIG. 1(d) shows examples of haptic substrates 150-170 illustrating different patterns generated by haptic effect in accordance with one embodiment of the present invention. Substrate 150 illustrates an array of tactile regions 152 wherein each region can be independently controlled and activated. Substrate 160 illustrates that nine (9) tactile regions 162 situated in the mid-section of substrate 160 are activated and raised. Also, two sections 172-174 of haptic substrate 170 have been raised to provide a different surface pattern. It should be noted that different patterns can be generated from the array of tactile regions in response to the various control signals. It should be further noted that substrate can change over time, which causes flexible surface 102 to change as well.

Figure 1E:
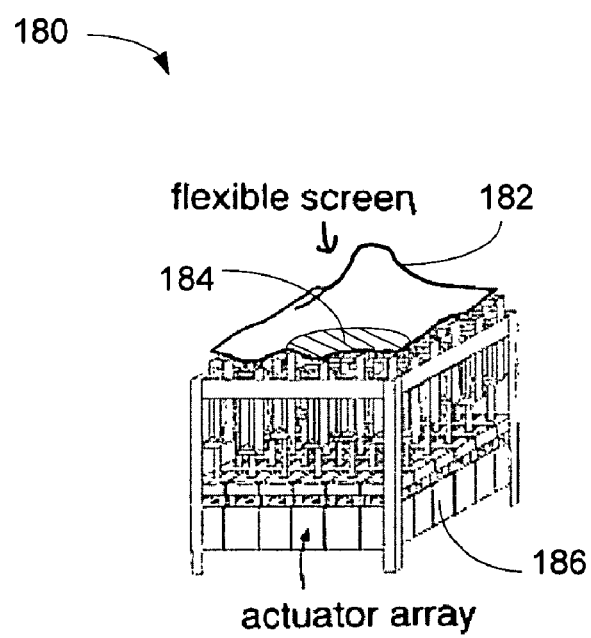

FIG. 1(e) illustrates a haptic device 180 using haptic substrates and flexible surfaces in accordance with one embodiment of the present invention. Device 180 includes a flexible screen and an array of actuator 186 wherein the flexible screen is capable of combining haptic sensation with computer graphics. The flexible screen, for example, illustrates the terrain and/or texture of a mountain 182 as well as a watery sensation or texture of a lake 184. When a computer displays a graphical representation of a mountain terrain and a lake, device 180 provides realistic sensation of mountain terrain for the mountain and watery texture for the lake. For example, a user feels a watery sensation when he or she touches lake 184 or feels a rocky sensation if he or she touches mountain 182. When the computer, however, displays another graphical representation, such as a beach, device 180 will change its surface characteristic to illustrate the beach or sandy sensation. It should be noted that haptic substrate 104 may be used to replace actuator array 186 in device 180.

FIG. 2(a) is a diagram 200 illustrating a cross section view of haptic device capable of generating haptic feedback using plasma actuator in accordance with one embodiment of the present invention. Diagram 200 shows a device 216 in an off-state and a device 218 in an on-state. The off-state indicates an inactive state while an on-state means an active state. Device 216 or 218, in one embodiment, is a plasma actuator. It should be noted that the underlying concept of the exemplary embodiment of the present invention would not change if additional layer were added to or removed from diagram 200.

Device 216 includes a touch surface 202, a substrate 204, and a separation gap 206, wherein gap 206 is configured to facilitate plasma actuation. In one aspect, touch surface 202 is a deformable touch-sensitive surface capable of detecting one or more events. An event includes a contact, a depression, a motion, a surrounding condition, or the like. Gap 206 is situated between touch surface 202 and substrate 204 for housing plasma. In one example, gap 206 is divided into multiple air pockets for housing a portion of plasma in each pocket. The concentration of plasma, for instance, can be different between the pockets within gap 206. Substrate 204 facilitates and generates plasma in gap 206 and is also known as a plasma substrate. To facilitate and increase plasmatic gas, substrate 204 is connected with a power supply, which can either be a battery or an AC (alternating current) power outlet.

Device 218 includes a user's hand 208, a deformable touch surface 202, a substrate 204, and a separation gap 206 wherein gap 206 is configured to facilitate actuation. It should be noted that device 218 is an active state or on-state of device 216. When the index finger of user's hand 208 presses on the top of touch surface 202, touch surface 202 deforms in response to finger pressure 212. Finger contact or pressure 212, in one embodiment, activates or triggers a device from an inactive state to an active state. When touch surface 202 deforms, the distance between touch surface 202 and substrate 204 at the point of finger pressure 212 reduces from distance 214 to distance 213. The shortened distance 213 causes an energy transfer 210 from substrate 204 to touch surface 202 via a plasma channel in gap 206. As such, a haptic response at finger pressure 212 is generated in response to energy transfer 210. Different chemical composition of plasma in gap 206 triggers different amount of energy transfers. Different amount of energy transfer leaping from substrate 204 to touch surface 202 renders different types of haptic response.

In an alternative embodiment, gap 206 can be divided into multiple air pockets for housing plasma, wherein plasma at each pocket can perform an energy transfer independent from plasma located at adjacent pocket(s). It should be noted that depending on the applications, the index finger of user's hand 208 can be replaced with any applicable objects, such as a stylus, a pen, a pointed instrument, and the like. Note that a person of skill in the art is aware that plasma, often referred to as ionized gas, is electrically conductive.

Referring back to FIG. 2(a), a mechanical representation of a deformable surface 202 is similar to snap-dome button switch, which triggers a reaction when the surface of the button is deformed enough to actuate the switch. In one aspect, plasma or plasma gas or plasma cloud is capable of moving from one side of switch or device to other side (to the actuation surface) directly under the point of surface contact 212 for energy discharge and/or static discharge. It should be noted that the bottom of touch surface 202 acts as one half of the haptic feedback generator switch with the second half of the generator switch laying closely below it so as to act as an open circuit. Haptic actuation occurs when the two halves of the circuit connected by a leap of current from one side of the switch to the other. For example, lead current or energy transfer 210 travels from substrate 204 to touch surface 202 as a closed circuit when a conductive channel of plasma is formed. The haptic actuation can vary based on the amount of pressure placed on the touch surface and/or the amount of surface area covered by the users' interaction. It should be noted that the variation of the actuation in the resultant of the haptic response (such as increased effect amplitude) is not necessary for device 218 to work.

FIG. 2(b) is a diagram 220 illustrating a cross section view of haptic device capable of generating haptic feedback using plasma actuator in accordance with one embodiment of the present invention. Diagram 220 shows a device 236 in an off-state and a device 238 in an on-state. The off-state indicates an inactive state while the on-state means an active state. Device 236 or 238 can be a plasma actuator. It should be noted that the underlying concept of the exemplary embodiment of the present invention would not change if additional layer were added to or removed from diagram 220.

Device 236, similar to diagram 216 illustrated in FIG. 2(a), includes a touch surface 222, a substrate 224, and a separation gap 226, wherein gap 226 is configured to facilitate actuation. In one aspect, touch surface 222 is a capacitive sensitive or a pressure-sensing surface capable of detecting an event. Gap 226, in one embodiment, is situated between touch surface 222 and substrate 224 for housing plasma. In one example, gap 226 is divided into multiple air pockets for housing plasma. The concentration of plasma, for instance, can be different between the pockets. Substrate 224 is coupled to a power supply and generates plasma in gap 226. An advantage of dividing gap 226 into pockets is to control the amount of energy that can be transferred.

Device 238 includes a user's hand 228, a solid capacitance sensitive touch surface 222, a substrate 224, and a separation gap 226 wherein gap 226 is configured to facilitate actuation. In one aspect, touch surface 222 can also be a resistive sensitive touch surface, a temperature sensitive touch surface, a motion sensitive surface, and so forth. It should be noted that device 238 is an active state or on-state of device 236. When the index finger of hand 228 touches, contacts, or presses on the top of touch surface 222, touch surface 222 detects capacitance change due to finger capacitance at a contact or interactive point 232. Note that the finger contact at point 232 triggers or activates device 238. Upon detecting the change of capacitance or contact capacitance at contact point 232, conductive carriers within plasma are drawn to a region 234. As such, a plasma channel is formed at region 234 when concentration of conductive carriers in plasma at region 234 reaches at a conductive level.

In other words, when sufficient conductive carriers in gap 226 are aggregated at a region 234 in response to the finger contact, a plasma conductive channel is formed at region 234. After formation of the plasma conductive channel, an energy transfer 230 takes place. When energy or current travels from substrate 224 to touch surface 222 through plasma channel at region 234, a haptic response acknowledging the finger contact is generated. Depending on chemical compositions of plasma as well as concentrations of conductive plasma carriers in gap 226, different types of haptic feedback can be generated. It should be noted that gap 226 can be divided into multiple air pockets for housing a portion of plasma, wherein plasma at each pocket can transfer energy independent from plasma located at the adjacent pocket(s).

It should be noted that a plasma channel at the contact point can be established almost instantaneously at the time the contact is made. The electro-mechanical representation of instantaneous plasma channel at the time of contact is similar to the representation of a "plasma lightning lamp." For example, when a finger touches the plasma lightning lamp, a reaction of plasma is that it is being drawn to and concentrated at the points of contact. It should be noted that the speed of aggregation of plasma is as quick as static-electric discharge. An advantage of using plasma actuators instead of conventional haptic devices is that the plasma actuator is simple, small, and light.

FIG. 2(c) is a diagram 240 illustrating a cross section view of haptic device capable of generating haptic feedback using plasma actuator in accordance with one embodiment of the present invention. Diagram 240 shows a device 256 in an off-state and a device 258 in an on-state. The off-state indicates an inactive state and the on-state means an active state. In one embodiment, device 256 or 258 is a plasma actuator. It should be noted that the underlying concept of the exemplary embodiment of the present invention would not change if additional layer were added to or removed from diagram 240.

Device 256 includes a touch surface 242, a substrate 244, and a separation gap 246, wherein gap 246 is configured to facilitate actuation. In one aspect, touch surface 242 is a deformable touch-sensitive surface capable of detecting an event. Event includes a contact, a depression, a motion, a surrounding condition, or the like. Gap 246, in one embodiment, is situated between touch surface 242 and substrate 244 for housing plasma. In one example, gap 246 is divided into multiple air pockets 252 for housing a portion of plasma in each pocket 252. The concentration of plasma, for instance, can be different between the pockets within gap 246. Plasma is facilitated and generated by substrate 244, which is also known as a plasma substrate. To facilitate and increase plasma, substrate 244 is connected with a power supply, which can either be a battery or an AC (alternating current) power outlet or a wireless power supply.

Device 258 includes multiple finger contacts 248, a deformable touch surface 242, a substrate 244, and a separation gap 246 wherein gap 246 is configured to facilitate actuation. It should be noted that device 258 is an active or on-state of device 256. When multiple fingers 248 press on the top of touch surface 222, touch surface 222 deforms in response to finger pressures 248. Note that finger pressures 248, in one embodiment, activate device 258. When touch surface 242 deforms at points of finger pressures 242, distances at regions 264 of separation gap 246 are reduced. The reduced or shortened distances at regions 264 cause energy transfers 250 from substrate 244 to touch surface 242 via plasma channels in gap 246. It should be noted that the energy transfer at each region 264 is independent from an adjacent energy transfer. As such, multiple haptic responses acknowledging finger pressures 248 are generated in response to energy transfers 250.

Depending on chemical compositions of plasma in gap 246, amount of energy transferred can vary. Different level of energy transfer to touch surface 242 renders different types of haptic response. It should be noted that gap 246 can be just one single air pocket for housing plasma.

Referring back to FIG. 2(c), a mechanical representation of a deformable surface 242 is similar to snap-dome button switch, which triggers a reaction when the surface of the button is deformed enough to actuate the switch. In one aspect, plasma or plasma cloud is capable of moving from one side of the switch or device (the plasma generator) across to the other side (to the actuation surface) directly under the user points of surface contacts for energy transfer and/or static discharge. The haptic actuation can vary based on the amount of pressure placed on the touch surface and/or the amount of surface area covered by the users' interaction. It should be noted that variation of actuation in the resultant of haptic response (such as increased effect amplitude) is not necessary for device 258 to work.

FIG. 2(d) is a diagram 260 illustrating a cross section view of haptic device capable of generating haptic feedback using plasma generator in accordance with one embodiment of the present invention. Diagram 260 shows a device 276 in an off-state and a device 278 in an on-state, wherein the off-state indicates an inactive state and the on-state means an active state. It should be noted that the underlying concept of the exemplary embodiment of the present invention would not change if additional layer were added to or removed from diagram 260.

Device 276, similar to diagram 246 illustrated in FIG. 2(c), includes a touch surface 262, a substrate 264, and a separation gap 266, wherein gap 266 is configured to facilitate actuation. In one aspect, touch surface 262 is a capacitive sensitive or a capacitive pressure-sensing surface capable of detecting one or more events. Gap 266, in one embodiment, is situated between touch surface 262 and substrate 264 for housing plasma. In one example, gap 266 is divided into multiple air pockets for housing plasma. The concentration of plasma, for instance, can be different between the pockets within gap 266. Substrate 264 is capable of facilitating as well as generating plasma cloud, and is connected with a power supply.

Device 278 includes multiple finger pressures 268, a solid capacitance sensitive touch surface 262, a substrate 264, and a separation gap 266 wherein gap 266 is configured to facilitate actuation. In one aspect, touch surface 262 can also be a resistive sensitive touch surface, a temperature sensitive touch surface, a motion sensitive touch surface, and so forth. It should be noted that device 278 is an active state or on-state of device 276. When finger pressures 268 touch, contact, or press on the top of touch surface 262, touch surface 262 detects multiple capacitance changes in response to the finger capacitances at contacts or interactive points 272. One finger contact, for instance, can activate device 278. Upon detecting finger capacitances or contact capacitances at touch surface 222, conductive carriers within plasma are drawn to contact points 272.

When sufficient conductive carriers in gap 226 are aggregated at contact region 272 in response to finger contacts 268, plasma conductive channels are formed at regions 272. After formation of the plasma conductive channels, energy transfers 270 take place. When energy or current travels from substrate 224 to touch surface 222 through plasma channels, multiple haptic responses acknowledging finger contacts are generated. Depending on the chemical compositions of plasma and the concentration of the plasma in gap 266, different types of haptic feedback can be generated. It should be noted that gap 266 can be divided into multiple air pockets for housing plasma, wherein plasma at each pocket can transfer energy independent from plasma located at the adjacent pocket(s).

Figure 3A:
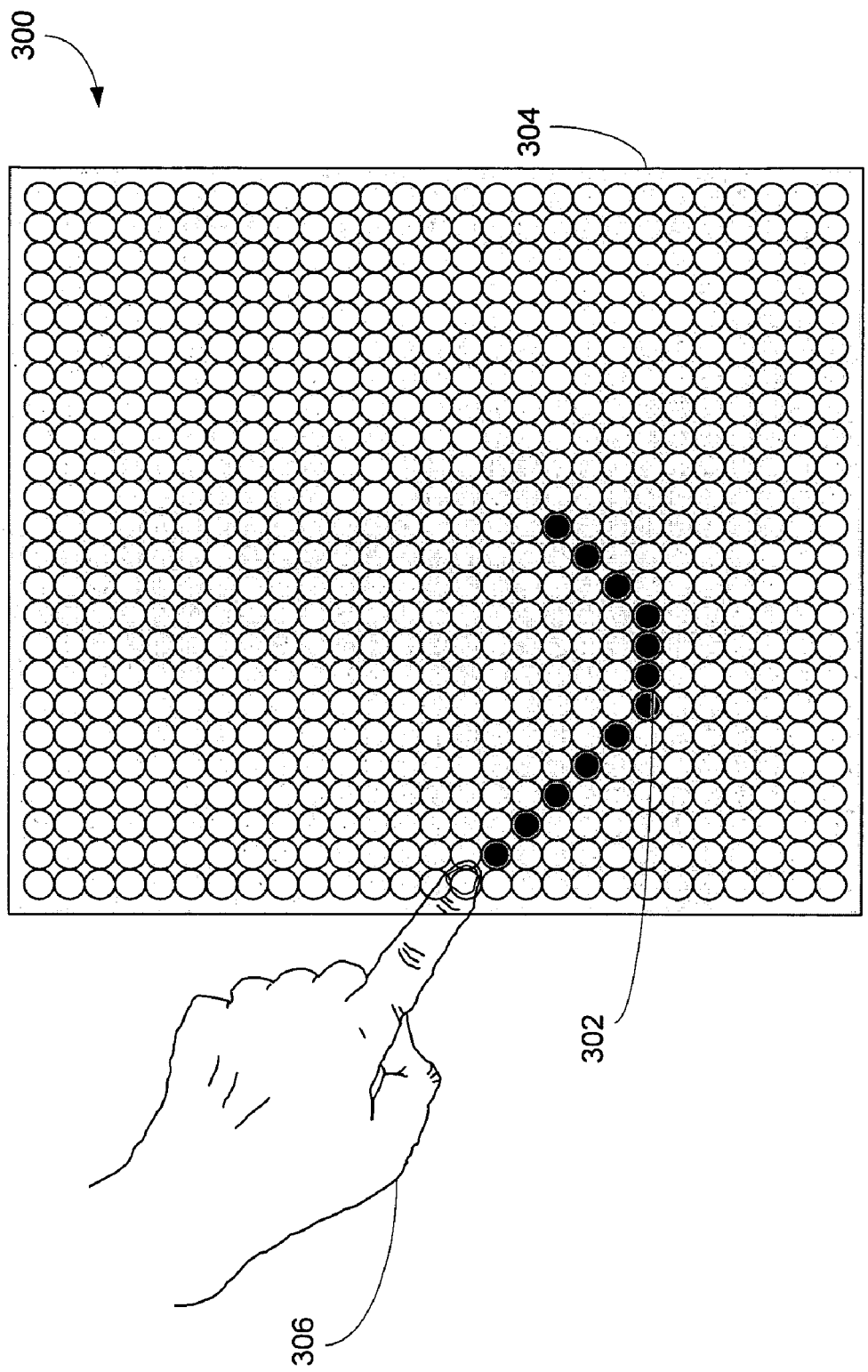
FIGS. 3(a-b) illustrate top views of haptic devices capable of generating haptic feedback using plasma actuator in accordance with one embodiment of the present invention.

FIG. 3(a) is a diagram 300 illustrating a top view of haptic device capable of generating haptic feedback using plasma generator in accordance with one embodiment of the present invention. Diagram 300 includes a hand 306 and a top view of haptic device 304, wherein an index finger of hand 306 is in contact with device 304. In one embodiment, device 304 is a plasma actuator. It should be noted that the underlying concept of the exemplary embodiment of the present invention would not change if additional layer were added to or removed from diagram 300.

In one aspect, haptic device 304 is a plasma generator capable of generating haptic feedback. Plasma generator, in one embodiment, is a haptic element capable of providing haptic feedback using plasmatic particles. For example, when the index finger of hand 306 drags across touch surface of device 304, device 304 generates a haptic trace 302. Haptic trace 302, in one aspect, is a series of snaps or vibro-tactile responses generated by energy transfers through plasma generator(s). It should be noted that device 304 can also be other types of haptic generator instead of plasma generator. It should be further noted that depending on the applications, the index finger of hand 306 can be replaced with any applicable objects, such as a stylus, a pen, a pointed instrument, and the like.

Device 304 includes a capacitive pressure-sensing surface and is capable of sending input energy to exact touch location (s) of a users' interaction(s). It should be noted that a haptic feedback generator can trigger one or more vibro-tactile or kinetic response(s). Alternatively, device 304 includes a resistive touch-surface surface configured to detect a contact and respond a haptic feedback to the contact or interaction location(s) acknowledging the contact. Noted that the contact surface can be either solid or deformable surface.

Figure 3B:
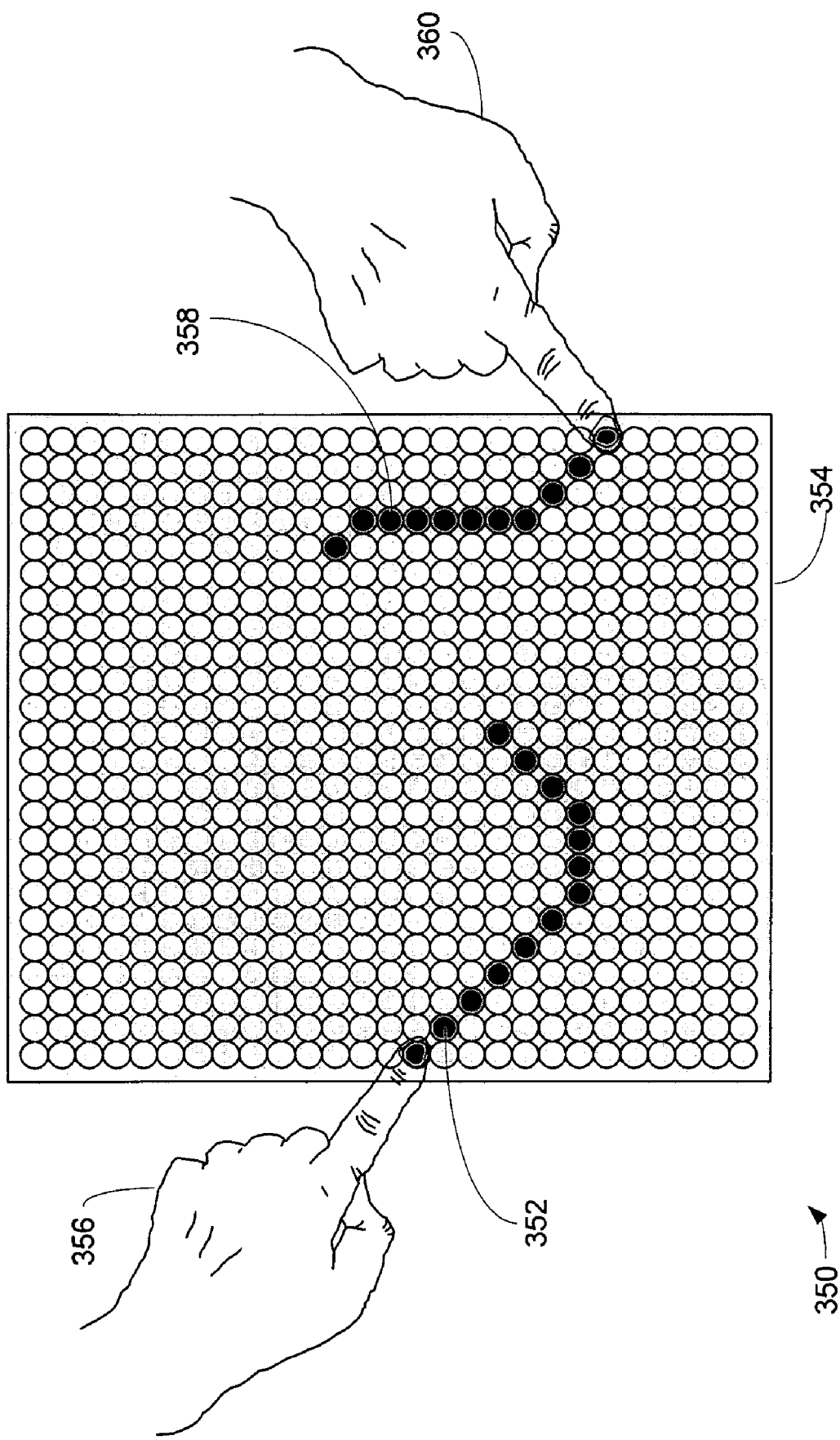

FIG. 3(b) is a diagram 350 illustrating a top view of haptic device capable of generating haptic feedback using plasma actuation in accordance with one embodiment of the present invention. Diagram 350 includes a first hand 356, a second hand 360, and a top view of haptic device 354, wherein index fingers of first and second hands are in contact with the surface of device 354. In one aspect, haptic device 354 is a plasma generator capable of generating haptic feedback.

Plasma generator, in one embodiment, is a haptic element capable of providing multiple haptic feedbacks using plasmatic particles. For example, when the index finger of hand 356 drags across touch surface of device 354, device 354 generates a haptic trace 352. Haptic trace 302, in one aspect, is a series of snaps or vibrotactile responses. Alternatively, when the index finger of first hands 356 and the index finger of second hand 360 drag across the touch surface of device 354 at the same or substantially the same time, two haptic traces 352 and 358 are generated in response to the drags. It should be noted that haptic response in a feedback of haptic trace is merely one type of feedback. Instead of generating haptic trace, device 354 can also generate tactile vibration, texture, sound, visual light, and so forth.

Device 354 can also use other types of haptic generator instead of plasma generator or a combination of plasma actuator and other haptic actuators, which will be described below, to emulate texture sensations, haptic fabric, haptic feedback acknowledgements, haptic objects, or the like. It should be noted that haptic substrates, haptic actuators, and/or haptic mechanisms as described above are used to control haptic feedback for haptic device. A combination of different haptic substrates, plasma cloud, and/or haptic mechanisms can be used in a haptic device to achieve the best haptic results. The following embodiments illustrated by FIG. 4 through FIG. 8 are additional examples of haptic devices or haptic actuators that can be used to generate haptic feedback for controlling surface texture as well as input confirmation of haptic device.

FIG. 4(a) illustrates a tactile or haptic region 410 using piezoelectric materials to generate haptic effects in accordance with one embodiment of the present invention. Region 410 includes an electrical insulated layer 402, a piezoelectric material 404, and wires 406. Electrical insulated layer 402 has a top surface and a bottom surface, wherein the top surface is configured to receive inputs. A grid or an array of piezoelectric materials 404 in one embodiment is constructed to form a piezoelectric or haptic layer, which also has a top and a bottom surface. The top surface of the piezoelectric layer is situated adjacent to the bottom surface of electrical insulated layer 402. Each region 410 includes at least one piezoelectric material 404 wherein piezoelectric material 404 is used to generate haptic effects independent of other piezoelectric region 410 in piezoelectric layer. In one embodiment, multiple adjacent or neighboring regions 410 are capable of generating multiple haptic effects in response to multiple substantially simultaneous touches. In another embodiment, each of regions 410 has a unique piezoelectric material thereby it is capable of initiating a unique haptic sensation.

It should be noted that a tactile touch panel, which includes an electrical insulated layer 402 and a piezoelectric layer, in some embodiments further includes a display, not shown in the figure. This display may be coupled to the bottom surface of the piezoelectric layer and is capable of projecting images that are viewable from the top surface of electrical insulated layer 402. It should be noted that the display can be a flat panel display or a flexible display. Piezoelectric materials 404, in one embodiment, are substantially transparent and small. The shape of piezoelectric material 404, for example, deforms in response to electrical potentials applied via electrical wires 406.

During a manufacturing process, a piezoelectric film is printed to include an array or a grid of piezoelectric regions 410. In one embodiment, a film of regions 410 containing piezoelectric materials is printed on a sheet in a cell grid arrangement. The film further includes wirings for directly addressing every region 410 in the device using electrical control signals. Region 410, for example, can be stimulated using edge or back mounted electronics. Piezoelectric materials may include crystals and/or ceramics such as quartz ($SiO_2$).

FIG. 4(b) illustrates a tactile or haptic region 410 generating haptic effects in accordance with an embodiment of the present invention. During operation, when a voltage potential applies to piezoelectric material 405 via wires 406, piezoelectric material 405 deforms from its original shape of piezoelectric material 404, as shown in FIG. 4(a), to an expanded shape of piezoelectric material 405. Deformation of piezoelectric material 405 causes electrical insulated layer 403 to deform or strain from its original state of layer 402, as shown in FIG. 4(a). In an alternative embodiment, piezoelectric materials 405 return to its original state as soon as the voltage potential is removed. It should be noted that the underlying concept of the present invention does not change if additional blocks (circuits or mechanical devices) are added to the device illustrated in FIG. 4(a-b). If the piezoelectric material is replaced with other materials such as SMAs, such material may be capable of maintaining its deformed shape for a period of time after the voltage potential is removed. It should be noted that the underlying concept of the embodiments of the present invention does not change if different materials other than piezoelectric actuators are employed. As such a grid of piezoelectric actuators may be used to control the surface texture of touch-sensitive surface of the interface device.

FIG. 4(c) is a diagram 450 illustrating another embodiment of a tactile or haptic region or cell 410 using MEMS device 452 to generate haptic effects in accordance with one embodiment of the present invention. Diagram 450 depicts a block 460, which shows a top view of cell 410. Cell 410 includes a MEMS device 452. In one embodiment, MEMS device 452 is substantially transparent thereby the image projection from a display, not shown in FIG. 4(c), can be viewed through block 460. It should be noted that each of haptic cells 410 is coupled to at least one wire to facilitate and generate haptic effects.

MEMS can be considered as an integration of mechanical devices, sensors, and electronics on a silicon or organic semiconductor substrate, which can be manufactured through conventional microfabrication process. For example, the electronic devices may be manufactured using semiconductor fabrication process and micromechanical devices may be fabricated using compatible microfabrication process. In one embodiment, a grid or an array of MEMS devices 452 are made of multiple cantilever-springs. A grid of cantilever-springs can be etched using MEMS manufacturing techniques. Also, electrical wirings for stimulating or driving cantilever-springs can also be directly etched onto the surface of the MEMS device 452 thereby every single MEMS device can be correctly addressed. MEMS cantilevers can be stimulated using a resonant drive (for vibrotactile) or direct actuation (kinesthetic).

FIG. 4(d) illustrates a side view of MEMS device 452, wherein MEMS device 462 can be stimulated or deformed from its original state of MEMS device 452 to deformed state of MEMS device 464 when a voltage potential across MEMS device is applied. Displacement 454 between the original state and the deformed state depends on the composition of materials used and the size of MEMS device 452. Although smaller MEMS devices 452 are easier to fabricate, they offer smaller displacement 454. In one embodiment, cantilever-springs can be made of piezo materials. It should be noted that the actuation of piezo material is generally vibrotactile sensation. It should be further noted that piezo material can be used as a sensor for sensing fingertip positions and depressions.

MEMS device 452, in another embodiment, uses SMA in place of cantilever-spring as mentioned above. The actuation generated by MEMS device 452 using SMA provides kinesthetic actuation. SMA, also known as memory metal, could be made of copper-zinc-aluminum, copper-aluminum-nickel, nickel-titanium alloys, or a combination of copper-zinc-aluminum, copper-aluminum-nickel, and/or nickel-titanium alloys. Upon deforming from SMA's original shape, SMA regains its original shape in accordance with an ambient temperature and/or surrounding environment. It should be noted that the present invention may combine piezoelectric elements, cantilever-spring, and/or SMA to achieve a specific haptic sensation. As such, a grid of MEMS device 452 may be used to control the surface texture of touch-sensitive surface of the interface device.

Figure 5A:
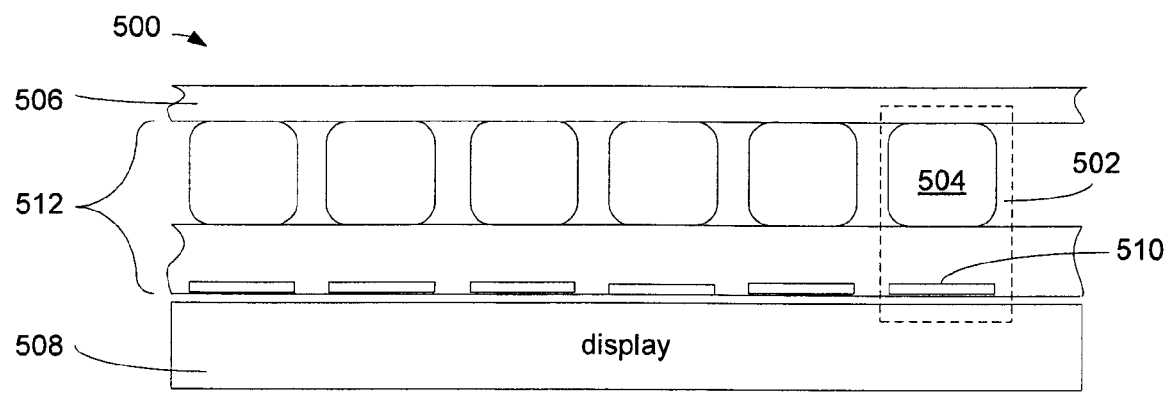
FIG. 5(a-b) illustrates a side view of a haptic device having an array of haptic cells with thermal fluid pockets in accordance with one embodiment of the present invention.

FIG. 5(a) is a side view diagram of an interface device 500 illustrating an array of haptic cells or tactile region 502 with thermal fluid pockets 504 in accordance with one embodiment of the present invention. Device 500 includes an insulated layer 506, a haptic layer 512, and a display 508. While the top surface of insulated layer 506 is capable of receiving inputs from a user, the bottom surface of insulated layer 506 is placed adjacent to the top surface of haptic layer 512. The bottom surface of haptic layer 512 is placed adjacent to display 508, wherein haptic layer 512 and insulated layer 506 may be substantially transparent thereby objects or images displayed in display 508 can be seen through haptic layer 512 and insulated layer 506. It should be noted that display 508 is not a necessary component in order for the interface device to function.

Haptic layer 512, in one embodiment, includes a grid of fluid filled cells 502, which further includes at least one thermal fluid pocket 504 and an associated activating cell 510. It should be noted that each of fluid filled cells 502 can include multiple thermal fluid pockets 504 and associated activating cells 510. In another embodiment, a fluid filled cell 502 includes multiple associated or shared activating cells 510 thereby initiating a different activating cell generates a different haptic sensation(s).

Activating cell 510, in one embodiment, is a heater, which is capable of heating an associated thermal fluid pocket 504. Various electrical, optical, and mechanical techniques relating to heating technology can be used to fabricate activating cells 510. For example, various electrically controlled resistors can be used for activating cells 510, wherein resistors can be implanted in haptic layer 512 during the fabrication. Alternatively, optical stimulators such as infrared lasers can be used as activating cells 510 to heat up thermal fluid pockets 504. Optical stimulator, for example, can be mounted at the edge of the interface device. It should be noted that activating cells 510 can be any types of optical or radioactive stimulator as long as it can perform the function of a heating device. Activating cells 510 may also include rear mounted thermal stimulators, which are similar technologies like hot plasma displays such as are commonly found in flat panel plasma televisions.

Device 500 further includes a set of control wires, not shown in FIG. 5(a), wherein each of activating cells 510 is coupled to at least one pair of wires. The wires are configured to transmit activating/deactivating control signals, which are used to drive activating cells 510. It should be noted that each of fluid filled cells 502 is addressable using signals from wires or wireless networks. Display 508, in one aspect, can be a flat panel display or a flexible display. In an alternative embodiment, the physical location of display 508 is exchangeable with haptic layer 512. Also, thermal fluid pockets 504, in one embodiment, can be activated by a piezoelectric grid.

Thermal fluid pockets 504, in one embodiment, include fluid with physical properties of low specific heat and high thermal expansion. Examples of this fluid include glycerin, ethyl alcohol, or the like. Thermal fluid pockets 504 are capable of producing multiple localized strains in response to multiple touches received by insulated layer 506. Each localized strain is created by a heated thermal fluid pocket 504 wherein the heat is generated by an associated activating cell 510. In one embodiment, a thermal fluid pocket 504 changes its physical shape in accordance with the temperature of the fluid in the pocket. In another embodiment, fluid filled cell 502 has an active cooling system, which is used to restore the expanded shape of thermal fluid pocket 504 to its original shape after it is deactivated. The control of fluid temperature affects haptic bandwidth. Rapid rising of fluid temperature and fast heat dissipation of fluid enhance haptic bandwidth of thermal fluid packets.

The physical size of each fluid cell 502 can also affect the performance of the cell for generating haptic sensation(s). For example, if the size of fluid cell 504 is smaller than ½ fingertip, the performance of cell 504 enhances because smaller cell permits rapid heat dissipation as well as quick temperature rising of fluid in the cell. In another embodiment, thermal plastic pockets filled with plastic fluid are used in place of thermal fluid pockets 504 filled with thermally sensitive fluid to enhance the haptic effects. Using thermal plastic pockets filled with plastic-like fluid can produce high thermal plastic strain. For example, a type of plastic fluid is polyethylene. Thermal plastic pockets can also provide different and unique haptic sensations to the user. In another embodiment, some exotic fluids such as electrorheological and/or magnetorheological fluid can be used in place of thermal fluid in thermal fluid pockets 504. Thermal fluid pockets 504 filled with electrorheological fluid can be stimulated by a local or remote electrical field, while thermal fluid pockets 504 filled with magnetorheological fluid can be stimulated by a local or remote magnetic field.

Figure 5B:
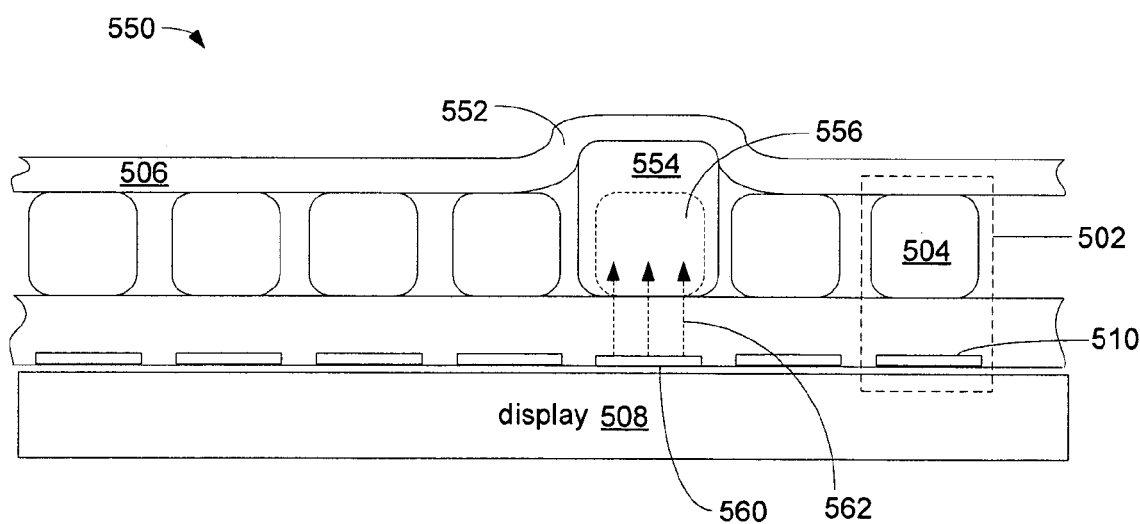

FIG. 5(b) is a side view diagram for an interface device 550 illustrating an array of haptic cells 502 using thermal fluid pockets 554 in accordance with one embodiment of the present invention. Device 550 also shows an activated thermal fluid pocket 554 and an activated activating cell 560. During the operation, thermal fluid pocket 554 increases its physical volume (or size) from its original state 556 to expanded thermal fluid pocket 554 when activating cell 560 is activated. When activating cell 560 is activated, it provides heat 562 to thermal fluid pocket 554 or 556 to expand the size of thermal fluid pocket 554 or 556. Due to the expansion of thermal fluid pocket 554, a localized portion 552 of insulated layer 506 is created. As soon as the temperature of the fluid in the thermal fluid pocket 554 cools down, the size of thermal fluid pocket 554 returns to its original state 556. The change of size between original size of a thermal fluid pocket 556 and expanded size of thermal fluid pocket 554 generates a haptic effect. It should be noted that activating cell 560 could be an electric heater or an optical heater such as an infrared simulator. As such, an array of haptic cells using thermal fluid pockets 552 may be used to control the surface texture of touch-sensitive surface of the interface device.

FIG. 6(a) is a side view diagram of an interface device 600 illustrating an array of MEMS pumps 602 in accordance with one embodiment of the present invention. The array of MEMS pumps 602 can be used to implement tactile regions for controlling surface textures. Diagram 600 includes an insulated layer 606 and a haptic layer 612. While the top surface of insulated layer 606 is configured to receive a touch or touches from a user, the bottom surface of insulated layer 606 is placed adjacent to the top surface of haptic layer 612. The bottom surface of haptic layer 612 is, in one embodiment, placed adjacent to a display (not shown in FIG. 6(a)), wherein haptic layer 612 and insulated layer 606 may be substantially transparent thereby objects or images displayed in the display can be seen through haptic layer 612 and insulated layer 606. It should be noted that display is not a necessary component in order for the interface device to function.

Haptic layer 612, in one embodiment, includes a grid of MEMS pumps 602, which further includes at least one pocket 604. Each MEMS pump 602 includes a pressurized valve 608 and a depressurized valve 610. Pressurized valve 608 is coupled to an inlet tube 614 while depressurized valve 610 is coupled to an outlet tube 616. In one embodiment, inlet tube 614, which is under high liquid pressure, is used to pump liquid through pressurized valve 608 to expand pocket 604. Similarly, outlet tube 616, which is under low pressure, is used to release the liquid through depressurized valve 610 to release the pressure from pocket 604. In one embodiment, MEMS pumps 602 can be coupled to the same pressurized liquid reservoir. In addition, pressurized valve 608 and depressurized valve 610 may be combined into one single valve for both inlet tube 614 and outlet tube 616. It should be noted that inlet tube 614 and outlet tube 616 can also be combined into one tube.

A grid of MEMS pumps 602 includes an array of pressurized valves 608 and depressurized valves 610, wherein pressurized valves 608 are coupled with a rear or a side mounted liquid reservoir under pressure while depressurized valves 610 are coupled to a rear or a side mounted depressurized liquid reservoir with low pressure. Valves 608-610 control the filling and emptying the liquid pockets 604 in MEMS pumps 602 to produce localized strain. An advantage of using pressurized liquid reservoir is to quickly deform the surface of insulated layer 606 and to maintain the deformation with minimal or no energy consumption (or expenditure). It should be noted that MEMS pump 602 can also use pressurized air or other gases to achieve similar results as liquid.

Device 600 further includes a set of control wires 617-618, which can be used to control pressurized valve 608 and depressurized valve 610, respectively. It should be noted that each valve in haptic layer 612 is addressable using electrical signals transmitted from wires or wireless network.

Figure 6:
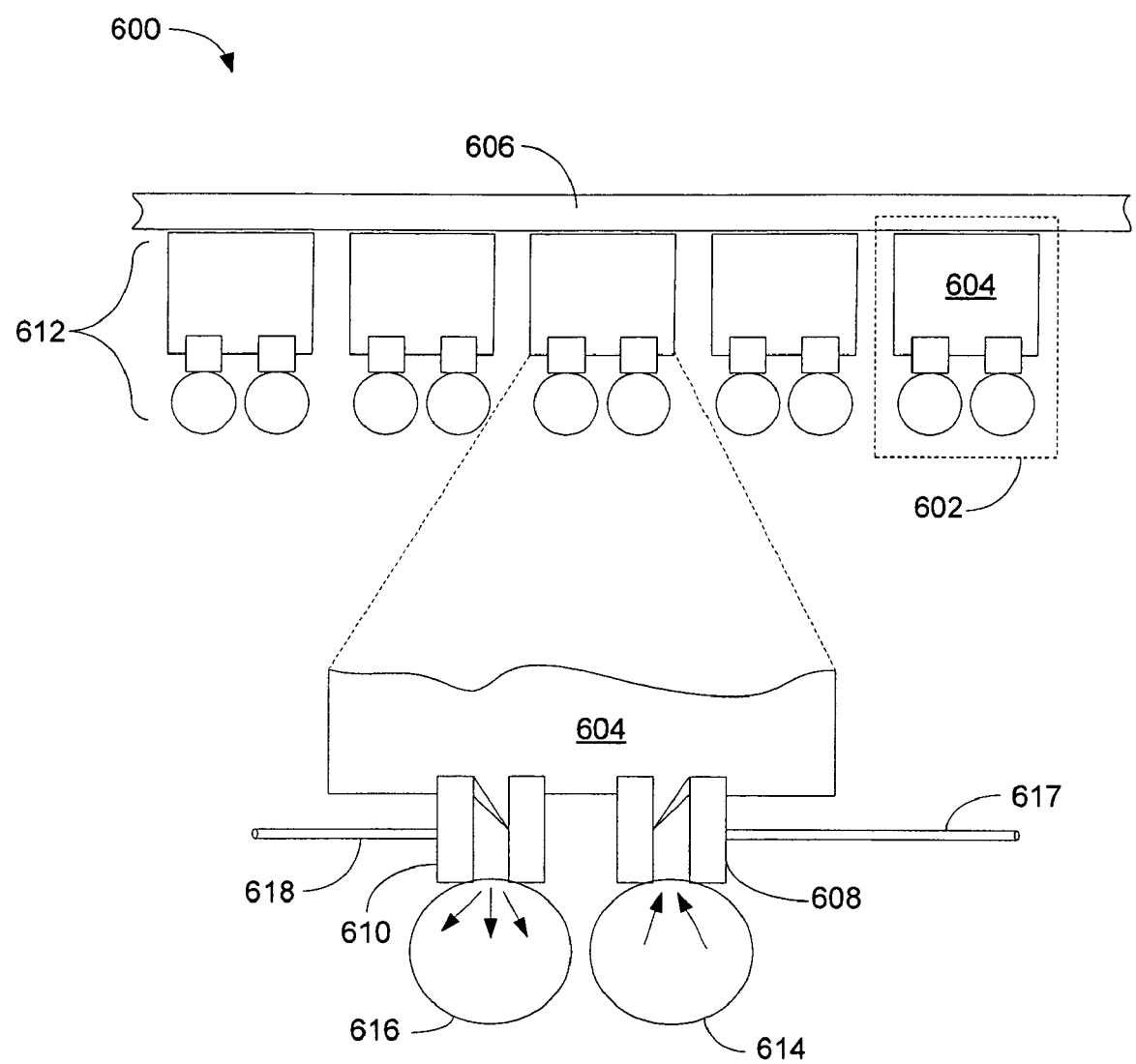
FIG. 6(a-b) illustrates a haptic cell employing MEMS pumps to generate haptic effects in accordance with one embodiment of the present invention.
Figure 6B:
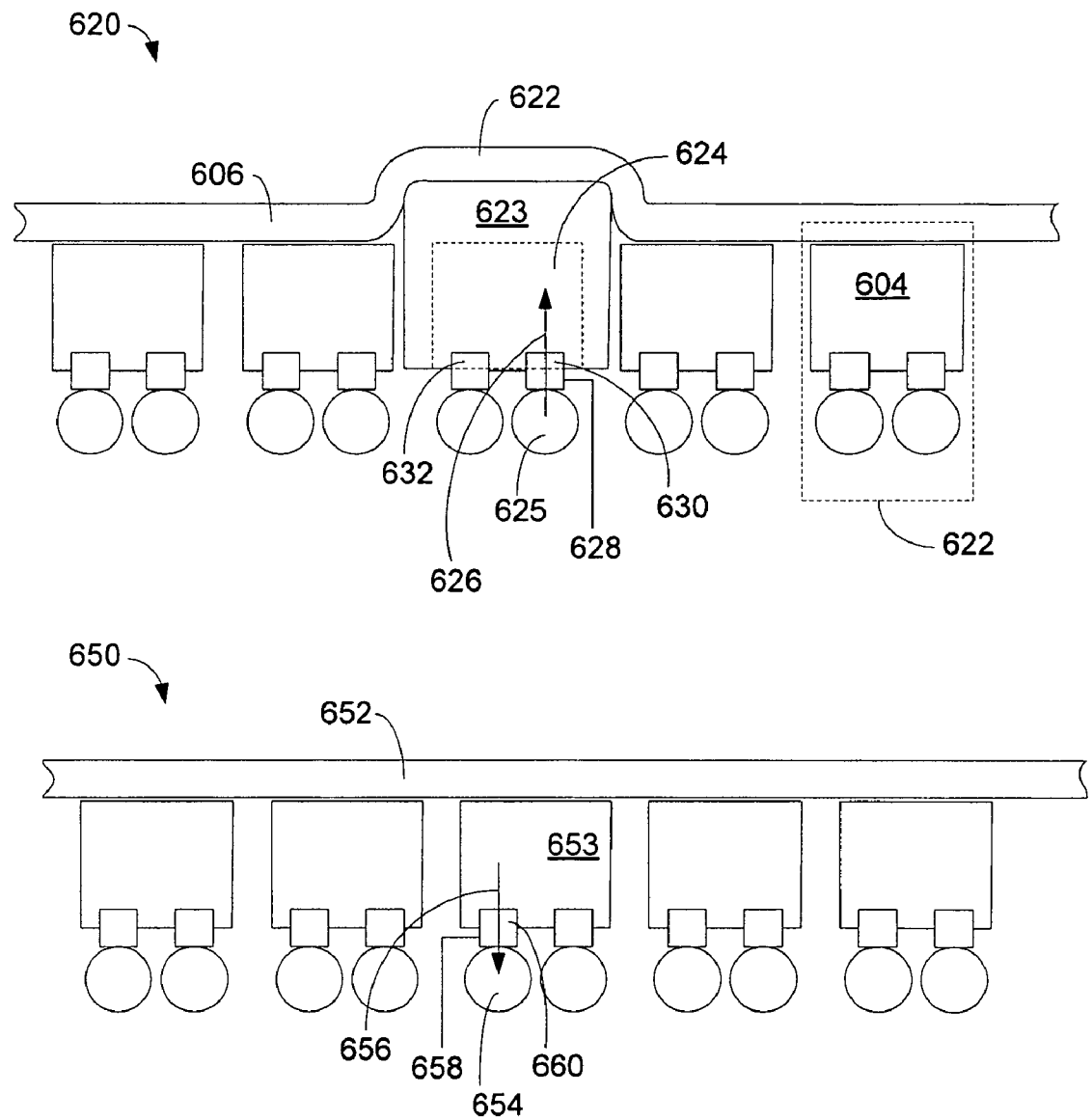

FIG. 6(b) illustrates two diagrams of an interface device 620 and 650 having an array of MEMS pumps 604 in accordance with one embodiment of the present invention. Device 620 illustrates an activated pocket 623, which includes an activated inlet valve 630 and a deactivated outlet valve 632. During an operation, pocket 623 increases its physical volume (or size) from its original state 624 to its expanded pocket 623 when inlet valve 630 is activated. When inlet valve 630 is activated (or open) in response to electrical signal from wire 628, inlet tube 625 pumps liquid 626 from pressurized reservoir to pocket 623. Due to the expansion of pocket 623, a localized strain 622 of insulated layer 606 is created.

Device 650 illustrates an activated MEMS pump returns from its expanded state of pocket 623 to the original state of pocket 653. When depressurized valve 660 is activated, depressurized valve 660 releases liquid 656 from pocket 653 to low pressurized outlet 654. It should be noted that depressurized valve 660 is controlled by at least one control signal via wire 658. The change in volume between original size of pocket 604 and expanded size of pocket 623 generates haptic effects. As such, an array of MEMS pumps 602 may be used to control the surface texture of touch-sensitive surface of the interface device.

Figure 7:
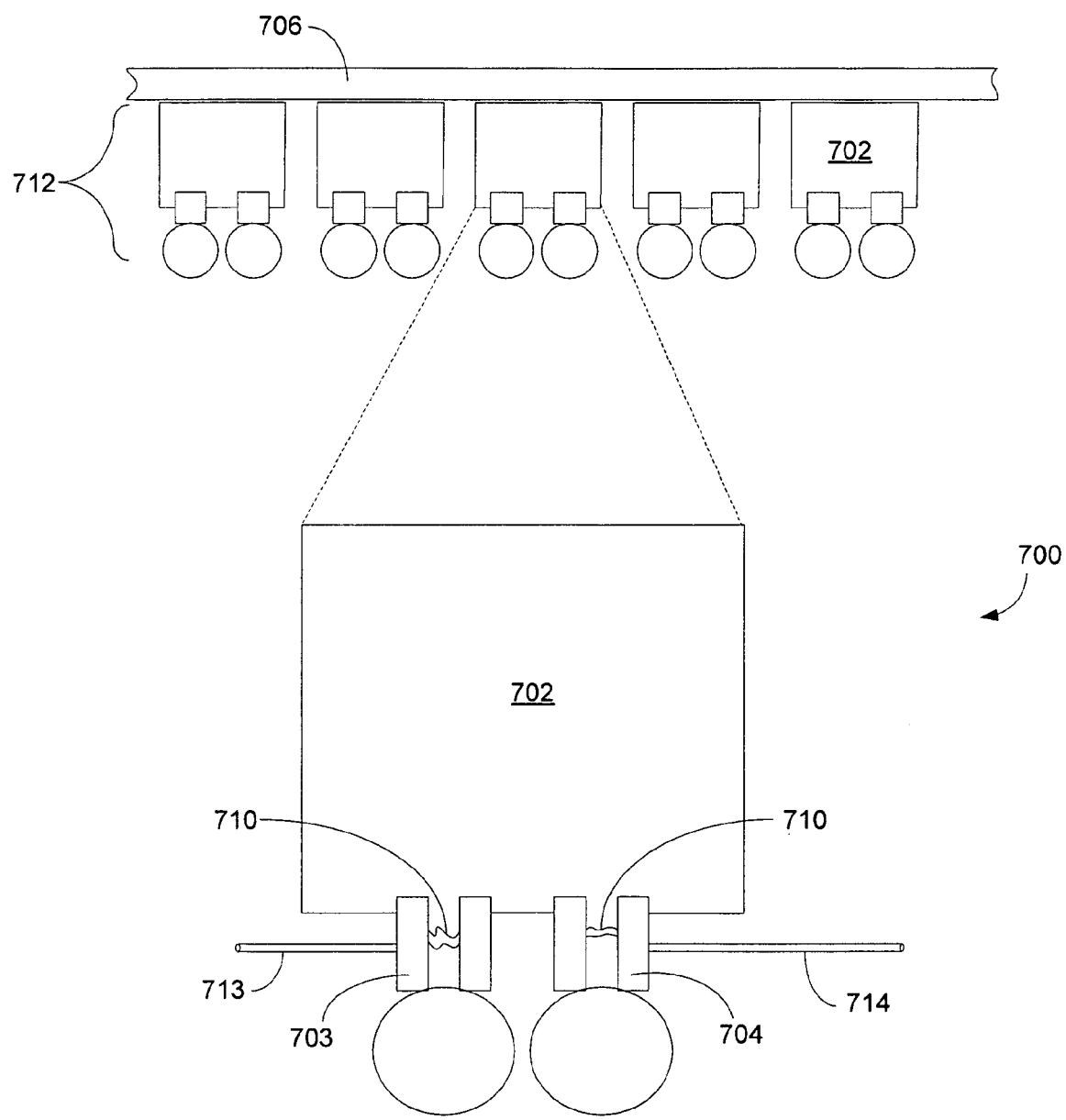
FIG. 7 illustrates a side view diagram for a haptic device having an array of haptic cells using variable porosity membrane in accordance with one embodiment of the present invention.

FIG. 7 illustrates a side view diagram for an interface device 700 having an array of haptic cells 702 using variable porosity membrane 710 in accordance with one embodiment of the present invention. The porosity membrane 710 can be used to implement tactile regions for controlling surface textures. Device 700 includes an insulated layer 706 and a haptic layer 712. While the top surface of insulated layer 706 is configured to receive inputs from a user, the bottom surface of insulated layer 706 is placed adjacent to the top surface of haptic layer 712. The bottom surface of haptic layer 712 is, in one embodiment, placed adjacent to a display (not shown in FIG. 7), wherein haptic layer 712 and insulated layer 706 may be substantially transparent thereby objects or images displayed in the display can be seen through haptic layer 712 and insulated layer 706. It should be noted that display is not a necessary component in order for the interface device to function.

Haptic layer 712, in one embodiment, includes a grid of haptic cells 702, inlet valves 703, and outlet valves 704. Haptic cells 702, in one embodiment, are pockets capable of containing fluid. Haptic layer 712 is similar to haptic layer 612 as shown in FIG. 6(a) except that haptic layer 712 employs porosity membranes. While each inlet valve 703 is controlled by control signal(s) transmitted by wire 713, each outlet valve 704 is controlled by electrical signals transmitted over a wire 714. Every inlet valve 703 or outlet valve 704 employs at least one porosity membrane 710. Porosity membranes 710 are coupled (or faced) to a liquid reservoir wherein each membrane 710 is configured to control how much liquid should enter and/or pass through membrane 710. An advantage of using porosity membranes is to maintain the deformation of insulated layer 706 with minimal or no energy consumption. As such, a grid of haptic cells using variable porosity membrane 710 may be used to control the surface texture of touch-sensitive surface of the interface device.

Figure 8:
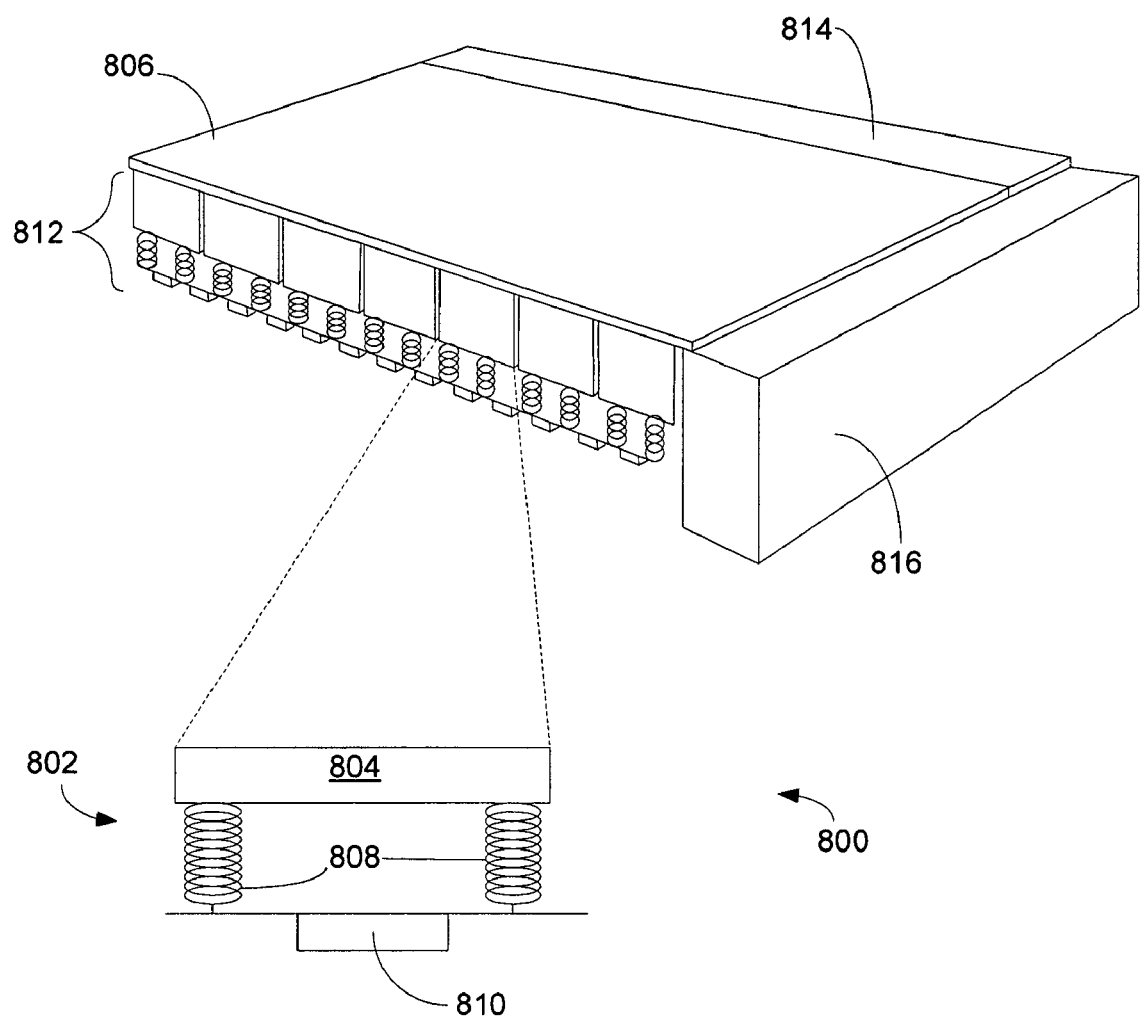
FIG. 8 is a side view of a haptic device having an array of haptic cells using various resonant devices in accordance with one embodiment of the present invention.

FIG. 8 is a side view of an interface device 800 having an array of haptic cells 802 using various resonant devices in accordance with one embodiment of the present invention. The array of haptic cells 802 can be used to implement tactile regions for controlling surface textures. Device 800 includes an insulated layer 806 and a haptic layer 812. While the top surface of insulated layer 806 is configured to receive an input from a user, the bottom surface of insulated layer 806 is placed adjacent to the top surface of haptic layer 812. The bottom surface of haptic layer 812 is, in one embodiment, placed adjacent to a display (not shown in FIG. 8), wherein haptic layer 812 and insulated layer 806 may be substantially transparent thereby objects or images displayed in the display can be seen through haptic layer 812 and insulated layer 806. It should be noted that insulated layer 806 may be flexible whereby it is capable of providing desirable relief information on its surface.

Haptic layer 812, in one embodiment, includes a grid of haptic cells 802, wherein each cell 802 further includes a permanent magnet 804, an electro magnet 810, and two springs 808. Haptic layer 812 is similar to haptic layer 612 shown in FIG. 6(a) except that haptic layer 812 employs resonant devices while haptic layer 612 uses MEMS pumps. Haptic cell 802, in one embodiment, uses a resonant mechanical retractable device to generate haptic effects. The resonant mechanical retractable device vibrates in response to a unique frequency, which could be generated by a side mounted resonant stimulator 816 or a rear mounted resonant stimulator 814. A resonant grid, in one embodiment, is used to form a haptic layer 812. Each cell 802 is constructed using resonant mechanical elements such as linear resonant actuator ("LRA") or MEMS springs. Each cell 802, however, is configured to have a slightly different resonant frequency and a high Q (high amplification at resonance and a narrow resonant frequency band). As such, each cell 802 can be stimulated using mechanical pressure waves originating at the edges of the sheet. The haptic effects can also be generated by a piezoelectric or other high bandwidth actuator.

Cell 802, in another embodiment, includes one spring 808. In yet another embodiment, cell 802 includes more than two springs 808. Each spring 808 is configured to respond to a specific range of frequencies thereby each spring 808 can produce a unique haptic sensation. As such, a grid of haptic cells using various resonant devices may be used to control the surface texture of touch-sensitive surface of the interface device. For example, if the displacement of haptic mechanism is sufficiently high such as 200 micrometers or greater, the movement (or tactile vibration) with low frequencies such as 50 Hz or less should sufficiently create desirable relief information.

The exemplary embodiment(s) of the present invention includes various processing steps which will be described below. The steps of the embodiments may be embodied in machine or computer executable instructions. The instructions can be used to cause a general purpose or special purpose system or controller, which is programmed with the instructions, to perform the steps of the embodiment(s) of the present invention.

Figure 9:
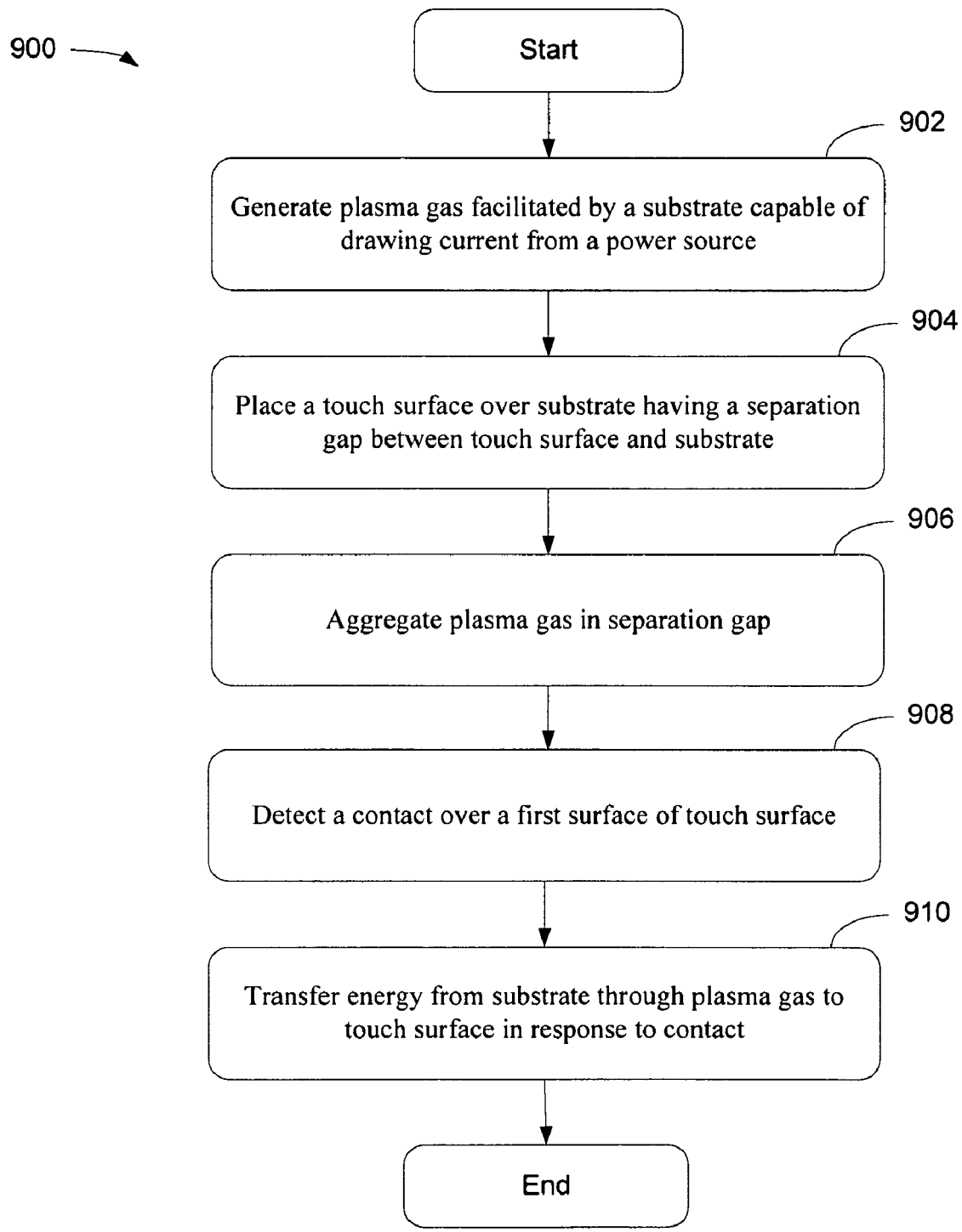
FIG. 9 is a flowchart illustrating a process of generating haptic feedback from plasma actuation in accordance with one embodiment of the present invention.

FIG. 9 is a flowchart 900 illustrating a process of generating haptic feedback from plasma generator in accordance with one embodiment of the present invention. At block 902, a process of providing haptic feedback generates plasma, which is facilitated by a substrate. The substrate, for instance, is coupled to a power source. The process is further capable of providing ionized gas with free electrons.

At block 904, the process places a touch surface over the substrate with a separation gap between the touch surface and the substrate. In one embodiment, upon depositing a touch-sensitive flexible surface capable of sensing a depressing by a user's finger, the process divides the separation gap into multiple pockets, which are capable of housing plasma. Alternatively, after depositing a touch-sensitive surface capable of sensing a finger capacitance from a touch by a user's finger, the process divides the separation gap into multiple pockets, which are capable of housing plasma.

At block 906, the process aggregates plasma in the separation gap. In one aspect, the process fills one or more pockets in the separation gap with ionized gas having free electrons.

At block 908, the process detects a contact over a first surface of the touch surface. In one embodiment, the process is capable of sensing a depression of a finger tip on a deformable touch surface. Alternatively, the process is capable of sensing a change of capacitance caused by a touch of a finger tip on the touch surface.

At block 910, the process transfers energy from the substrate through plasma to the touch surface in response to the contact. Upon coupling a substrate with a power source and coupling a touch sensitive device to the touch surface for detecting the contact, the process provides tactile feedback to acknowledge the contact at the first surface in response to energy transfer from plasmas gas via a second surface of the touch surface to the first surface. In one example, the process is capable of releasing static discharge built up by the plasma. The process is also capable of initiating an energy transfer in response to the change of capacitance caused by the touch of a finger tip.

While particular embodiments of the present invention have been shown and described, it will be obvious to those skilled in the art that, based upon the teachings herein, changes and modifications may be made without departing from this invention and its broader aspects. Therefore, the appended claims are intended to encompass within their scope of all such changes and modifications as are within the true spirit and scope of the exemplary embodiment(s) of the present invention.

What is claimed is:

1. A haptic device, comprising:
    a touch surface capable of sensing a first event; and
    a substrate situated adjacent to the touch surface with a separation gap between the substrate and the touch surface, the separation gap comprising one or more plasma pockets, wherein the substrate is configured to provide plasma that accumulates at the separation gap, the accumulated plasma causing an energy transfer that imparts a first haptic feedback to the touch surface via the one or more plasma pockets in response to the first event,
    wherein the substrate is further configured to provide first plasma having a first concentration to a first pocket and second plasma having a second concentration to a second pocket, wherein the first concentration is different than the second concentration to cause a first amount of energy transfer that is different than a second amount of energy transfer.

2. The device of claim 1, wherein the touch surface comprises a flexible deformable touch pad.

3. The device of claim 2, wherein the touch surface capable of sensing a first event is configured to detect a contact when the touch surface deforms in response to a depression by a finger.

4. The device of claim 2, wherein the touch surface capable of sensing a first event is configured to detect a contact when the touch surface deforms in response to a contact by a stylus.

5. The device of claim 1,
    wherein the touch surface is capable of sensing a second event independent of the first event;
    wherein the separation gap includes a plurality of plasma pockets capable of housing the plasma; and
    wherein the substrate generates a second haptic feedback in response to the second event.

6. The device of claim 1, further comprising a sensor capable of sensing capacitance from a touch of the touch surface by an object.

7. The device of claim 1, wherein the substrate is coupled to a power supply and is capable of producing the plasma.

8. The device of claim 1,
    wherein the flexible surface comprises a touch-sensitive surface capable of sensing a touch on its surface; and
    wherein the plasma is ionized gas having free electrons.

9. The device of claim 1, wherein the energy transfer includes a plasma strike moving from the substrate to the touch surface.

10. The device of claim 1, wherein the first amount of energy transfer is performed independently of the second amount of energy transfer.

11. The device of claim 1, wherein the first amount of energy transfer facilitates a second haptic feedback that is different than a third haptic feedback facilitated by the second amount of energy transfer.

12. A method of providing haptic feedback via a device comprising a touch surface, a substrate and a separation gap disposed between the touch surface and the substrate, the method comprising:

generating plasma facilitated by the substrate, the substrate capable of drawing current from a power source;

providing first plasma having a first concentration to a first pocket of the separation gap and second plasma having a second concentration to a second pocket of the separation gap, wherein the first concentration is different than the second concentration to cause a first amount of energy transfer that is different than a second amount of energy transfer;

detecting a contact over a first surface of the touch surface; and transferring energy from the substrate through the provided plasma at the pocket to the touch surface in response to the contact.

13. The method of claim 12, further comprising:
coupling a substrate with a power source; and
coupling a touch sensitive device to the touch surface for detecting the contact.

14. The method of claim 12, wherein generating plasma facilitated by the substrate capable of drawing current from a power source includes providing ionized gas with free electrons.

15. The method of claim 12, further comprising placing a touch surface over the substrate having a separation gap between the touch surface and the substrate, wherein placing a touch surface over the substrate having a separation gap between the touch surface and the surface and the substrate includes:

depositing a touch-sensitive flexible surface capable of sensing a depressing by a user's finger; and dividing the separation gap into a plurality of pockets capable of housing the plasma.

16. The method of claim 12, further comprising placing a touch surface over the substrate having a separation gap between the touch surface and the substrate, wherein placing a touch surface over the substrate having a separation gap between the touch surface and the substrate includes:

depositing a touch-sensitive surface capable of sensing a finger capacitance from a touch by a user's finger; and dividing the separation gap into a plurality of pockets capable of housing the plasma.

17. The method of claim 12, wherein providing first plasma in the first separation gap further includes filling the first pocket in the first separation gap with ionized gas with negative carriers.

18. The method of claim 12, wherein detecting a contact over a first surface of the touch surface further includes sensing a depression of a finger tip on a deformable touch surface.

19. The method of claim 18, wherein transferring energy from the substrate through the provided plasma to the touch surface further includes providing tactile feedback to the contact at the first surface in response to energy transfer from plasmas gas via a second surface of the touch surface to the first surface.

20. The method of claim 12, wherein transferring energy from the substrate through the provided plasma to the touch surface includes releasing static discharge built up by the plasma.

21. The method of claim 12, wherein detecting a contact over a first surface of the touch surface further includes sensing a change of capacitance caused by a touch of a finger tip on the touch surface.

22. The method of claim 21, wherein transferring energy from the substrate through plasma to the touch surface further includes initiating an energy transfer in response to the change of capacitance caused by the touch of a finger tip.

23. The method of claim 12, wherein detecting a contact over a first surface of the touch surface further includes sensing a contact by an object on a deformable touch surface.

24. The method of claim 23, wherein sensing a contact by an object on a deformable touch surface includes detecting a touch on the first surface of the touch surface by a stylus.

25. An apparatus of providing haptic feedback, comprising:

means for generating plasma facilitated by a substrate capable of drawing current from a power source;

means for aggregating plasma in at a pocket of a separation gap situated between the substrate and a touch surface;

means for detecting a contact over a first surface of the touch surface; and means for transferring energy from the substrate through the aggregated plasma at the pocket to the touch surface in response to the contact, wherein the mean for aggregating plasma at the pocket of the separation gap includes mean for providing first plasma having a first concentration to the first pocket of the separation gap and second plasma having a second concentration to a second pocket of the separation gap, wherein the first concentration is different than the second concentration to cause a first amount of energy transfer that is different than a second amount of energy transfer.

26. The apparatus of claim 25, further comprising:
means for coupling a substrate with a power source; and
means for coupling a touch sensitive device to the touch surface for detecting the contact.

27. The apparatus of claim 25, wherein means for generating plasma facilitated by a substrate capable of drawing current from a power source includes means for providing ionized gas with free electrons.

* * * * *